US012333368B2

(12) United States Patent
Kataoka

(10) Patent No.: US 12,333,368 B2
(45) Date of Patent: Jun. 17, 2025

(54) CONTACTLESS COMMUNICATION MEDIUM

(71) Applicant: TOPPAN HOLDINGS INC., Tokyo (JP)

(72) Inventor: Shin Kataoka, Tokyo (JP)

(73) Assignee: TOPPAN HOLDINGS INC., Tokyo (JP)

( * ) Notice: Subject to any disclaimer, the term of this patent is extended or adjusted under 35 U.S.C. 154(b) by 0 days.

(21) Appl. No.: 18/765,187

(22) Filed: Jul. 5, 2024

(65) Prior Publication Data
US 2024/0362450 A1 Oct. 31, 2024

Related U.S. Application Data

(63) Continuation of application No. PCT/JP2022/048556, filed on Dec. 28, 2022.

(30) Foreign Application Priority Data

Jan. 7, 2022 (JP) ................................. 2022-001769
Jan. 7, 2022 (JP) ................................. 2022-001774

(51) Int. Cl.
*G06K 19/077* (2006.01)
*H01Q 1/22* (2006.01)

(52) U.S. Cl.
CPC ..... *G06K 19/07722* (2013.01); *H01Q 1/2283* (2013.01)

(58) Field of Classification Search
CPC ........................ G06K 19/07722; H01Q 1/2283
USPC ........................................................ 235/492
See application file for complete search history.

(56) References Cited

U.S. PATENT DOCUMENTS

| | | | | |
|---|---|---|---|---|
| 10,140,569 B2* | 11/2018 | Kim | ................ | G06K 19/07722 |
| 10,198,211 B2 | 2/2019 | Chung et al. | | |
| 12,159,180 B1* | 12/2024 | Finn | ................ | G06K 19/0723 |
| 2009/0145971 A1* | 6/2009 | Yin | ................ | G06K 19/07749 |
| | | | | 235/492 |
| 2011/0002107 A1* | 1/2011 | Tanaka | ............ | G06K 19/07745 |
| | | | | 361/762 |
| 2012/0043386 A1* | 2/2012 | Gotou | ................ | H05K 3/4038 |
| | | | | 29/601 |
| 2015/0144702 A1* | 5/2015 | Mei | ................ | G06K 19/0775 |
| | | | | 235/488 |

(Continued)

FOREIGN PATENT DOCUMENTS

JP 2014-075775 A 4/2014

OTHER PUBLICATIONS

International Searching Authority, "International Search Report," issued in connection with International Patent Application No. PCT/JP2022/048556, dated Mar. 28, 2023.

(Continued)

*Primary Examiner* — Allyson N Trail
(74) *Attorney, Agent, or Firm* — Foley & Lardner LLP

(57) ABSTRACT

A contactless communication medium including an IC module and a plurality of metal plates. Each of the plurality of metal plates has a through hole and a slit. At least two or more metal plates are laminated via an insulating layer. The metal plates include a first metal plate and a second metal plate. The second metal plate extends across the slit of the first metal plate in plan view of the first metal plate and adds electrostatic capacitance between portions of the slit of the first metal plate.

54 Claims, 27 Drawing Sheets

(56) References Cited

U.S. PATENT DOCUMENTS

| | | | |
|---|---|---|---|
| 2018/0123221 A1 | 5/2018 | Finn et al. | |
| 2020/0210803 A1* | 7/2020 | Ochi | H01Q 9/065 |
| 2022/0237423 A1* | 7/2022 | Lotya | G06K 19/07722 |
| 2024/0249104 A1* | 7/2024 | Finn | G06K 19/07773 |
| 2024/0362450 A1* | 10/2024 | Kataoka | H01Q 1/2283 |
| 2025/0045554 A1* | 2/2025 | Minks | G06K 19/07722 |

OTHER PUBLICATIONS

International Searching Authority, "Written Opinion," issued in connection with International Patent Application No. PCT/JP2022/048556, dated Mar. 28, 2023.

\* cited by examiner

CONTACTLESS COMMUNICATION MEDIUM

CROSS-REFERENCE TO RELATED PATENT APPLICATIONS

This application is a continuation application filed under 35 U.S.C. § 111(a) claiming the benefit under 35 U.S.C. §§ 120 and 365(c) of International Patent Application No. PCT/JP2022/048556, filed on Dec. 28, 2022, which is based upon and claims the benefit to Japanese Patent Application No. 2022-001769 filed on Jan. 7, 2022 and to Japanese Patent Application No. 2022-001774 filed on Jan. 7, 2022, the disclosures of all which are incorporated herein by reference in their entirety.

TECHNICAL FIELD

The present invention relates to a contactless communication medium.

BACKGROUND

Examples of conventionally known contactless communication media include a contactless communication medium that performs communication using a signal in the HF band (13.56 MHz) as shown in Patent Literature 1. The contactless communication medium includes a card sized metal plate, and an IC module including a contact communication terminal, a coupling coil antenna, and a communication IC chip. The metal plate has a through hole for attaching the IC module, and a slit extending from the through hole toward an outer periphery of the metal plate, serving as a main component of a communication antenna, and the IC module is attached to a through hole portion of the metal plate so that part of the through hole and the slit and part of the coupling coil antenna of the IC module overlap with each other. In such a contactless communication medium, electrostatic capacitance is added between portions of a slit to achieve better communication characteristics.

[Citation List] [Patent Literature] [PTL 1] U.S. Pat. No. 10,198,211 B.

SUMMARY OF THE INVENTION

Technical Problem

In a conventional contactless communication medium, a coupling coil antenna of an IC module is electrically connected to a metal plate via a through hole of the metal plate by electromagnetic coupling. In a contactless communication medium with such a system, a metal plate having an antenna function typically has a self-resonant frequency considerably higher than the communication frequency (13.56 MHz); thus, the contactless communication medium behaves as a nonresonant-type communication medium. A nonresonant-type communication medium can achieve impedance matching irrespective of the resonance frequency, but has the disadvantage of a short communication distance with a reader/writer.

The technique described in Patent Literature 1 in which electrostatic capacitance is added between portions of the slit is expected to have the effect of reducing the self-resonant frequency of the metal plate having an antenna function to a frequency close to the communication frequency of the contactless communication medium, achieving higher communication performance. However, such a technique requires an electrostatic capacitance element such as a chip capacitor to be mounted between portions of the slit and is not preferable considering the mass production efficiency of cards; thus, there is room for improvement in terms of demand for a simpler method of forming electrostatic capacitance.

The present invention has been made in view of the above problem, and an object of the present invention is to provide a contactless communication medium achieving larger electrostatic capacitance with a simple structure.

Solution to Problem

A first aspect of the present invention is a contactless communication medium including
- an IC module that includes a planar coil antenna and an IC chip, and
- a plurality of metal plates in each of which a metal plate edge portion serves as an antenna, wherein
- in plan view of a plate surface of the plurality of metal plates, each of the metal plates has a through hole in which the IC module fits or with which the IC module overlaps, and a slit that extends from the through hole toward the metal plate edge portion,
- the plurality of metal plates are laminated via an insulating layer,
- the plurality of metal plates include a first metal plate in which a peripheral portion of at least one of the through hole and the slit overlaps with or is close to at least part of the planar coil antenna of the IC module to serve as an antenna, and a second metal plate that is laminated adjacent to the first metal plate, and
- the second metal plate extends across the slit of the first metal plate in plan view of the first metal plate, and adds, between portions of the slit of the first metal plate, electrostatic capacitance as two flat plate capacitors connected in series.

A second aspect of the present invention is the contactless communication medium of the first aspect, wherein the slit of one of the plurality of metal plates extends from the through hole in a direction different from a direction in which the slit of another one of the plurality of metal plates extends from the through hole, the one of the plurality of metal plates and the another one of the plurality of metal plates are provided so that, in plan view, the slit of the one of the plurality of metal plates and the slit of the another one of the plurality of metal plates do not overlap with each other and are located on a same line, and a straight line formed by the slit of the one of the plurality of metal plates and the slit of the another one of the plurality of metal plates is located at a position at which an area of each of the one of the plurality of metal plates and the another one of the plurality of metal plates is divided into two.

A third aspect of the present invention is the contactless communication medium of the first aspect, wherein the slit of one of the plurality of metal plates extends from the through hole in a direction different from a direction in which the slit of another one of the plurality of metal plates extends from the through hole, the one of the plurality of metal plates and the another one of the plurality of metal plates are provided so that the slit of the one of the plurality of metal plates and the slit of the another one of the plurality of metal plates do not overlap with each other in plan view and are located on a same line, and a straight line formed by the slit of the one of the plurality of metal plates and the slit of the another one of the plurality of metal plates is located at a position at which an area of each of the one of the plurality of metal plates and the another one of the plurality of metal plates is divided into two so that an area ratio of one of the two to another one of the two is larger than 0.24.

A fourth aspect of the present invention is the contactless communication medium of any one of the first to third aspects, wherein at least part of a metal surface of at least one of the plurality of metal plates around the through hole overlaps in plan view with the planar coil antenna of the IC module via an insulator or a void.

A fifth aspect of the present invention is the contactless communication medium of the fourth aspect, wherein the metal plates include at least two metal plates, and the IC module fits in the through hole of one of the two metal plates, and the IC module overlaps with a peripheral portion of the through hole of another one of the two metal plates.

A sixth aspect of the present invention is the contactless communication medium of any one of the first to fifth aspects, wherein the plurality of metal plates include three metal plates, and
when an intermediate metal plate of the three metal plates is viewed as an antenna, the metal plates above and below the intermediate metal plate add, between portions of the slit of the intermediate metal plate, flat plate series capacitance as two flat plate capacitors connected in series.

A seventh aspect of the present invention is the contactless communication medium of any one of the first to sixth aspects, wherein the insulating layer is interposed between the plurality of metal plates, and the insulating layer has a thickness of 100 um or less.

An eighth aspect of the present invention is the contactless communication medium of the seventh aspect, wherein the insulating layer has a relative permittivity of 1.5 or more.

A ninth aspect of the present invention is the contactless communication medium of the seventh or eighth aspect, wherein the insulating layer is formed by laminating an insulation sheet having an adhesion function with the plurality of metal plates, followed by pressing.

A tenth aspect of the present invention is the contactless communication medium of the seventh or eighth aspect, wherein the insulating layer is formed by applying a resin having an adhesion function to the plurality of metal plates, followed by pressing.

An eleventh aspect of the present invention is the contactless communication medium of the tenth aspect, wherein the resin is applied to the metal plates by screen printing.

A twelfth aspect of the present invention is the contactless communication medium of any one of the first to eleventh aspects, wherein the plurality of metal plates have a same shape as an IC card that is the contactless communication medium, and effective electrostatic capacitance formed by the second metal plate that serves as the flat plate capacitors and extends across the slit of the first metal plate is 1 nF or more and 20 nF or less.

A thirteenth aspect of the present invention is the contactless communication medium of any one of the first to twelfth aspects, wherein the plurality of metal plates have a same shape as an IC card that is the contactless communication medium, and a resonance frequency of the first metal plate and the second metal plate laminated while the IC module is removed is more than 13.56 MHz and 25 MHz or less.

A fourteenth aspect of the present invention is the contactless communication medium of any one of the first to thirteenth aspects, wherein an absolute value of an imaginary part of an impedance at a communication frequency of the IC chip of the IC module or at a continuous wave frequency (13.56 MHz) is larger than an absolute value of an imaginary part of an impedance measured for a module alone of the planar coil antenna of the IC module.

A fifteenth aspect of the present invention is the contactless communication medium of any one of the first to fourteenth aspects, wherein an absolute value of an imaginary part of an impedance at a communication frequency of the IC chip of the IC module or at a continuous wave frequency is larger than an absolute value of an imaginary part of an impedance with the planar coil antenna of the IC module mounted to the peripheral portion of the through hole of the first metal plate but the second metal plate that forms flat plate capacitance omitted.

A sixteenth aspect of the present invention is the contactless communication medium of any one of the first to fifteenth aspects, wherein the laminated plurality of metal plates include a metal plate in which at least one metal foil is provided on one or both surfaces of a film substrate made of a resin.

A seventeenth aspect of the present invention is the contactless communication medium of the sixteenth aspect, wherein another metal layer is laminated, via the insulating layer, on the film substrate provided with the at least one metal foil.

An eighteenth aspect of the present invention is the contactless communication medium of the sixteenth or seventeenth aspect, wherein a metal foil pattern of the at least one metal foil has an outer dimension smaller than an outer dimension of the film substrate, and the at least one metal foil is laminated so that the metal foil pattern is located inside the film substrate in plan view.

A nineteenth aspect of the present invention is the contactless communication medium of the sixteenth or seventeenth aspect, wherein a metal foil pattern of the at least one metal foil has a through hole larger in size than a through hole of the film substrate, and the at least one metal foil is laminated so that the through hole of the film substrate is located inside the through hole of the metal foil pattern.

A twentieth aspect of the present invention is the contactless communication medium of any one of the sixteenth to nineteenth aspects, wherein the film substrate has a through hole that is located in a portion of the film substrate corresponding to a through hole of a metal foil pattern of the at least one metal foil and that has a same shape as the through hole of the metal foil pattern or a smaller size than the through hole of the metal foil pattern.

A twenty-first aspect of the present invention is the contactless communication medium of any one of the sixteenth to twentieth aspects, wherein the at least one metal foil is made of copper or aluminum, and the at least one metal foil has a thickness larger than a skin depth at a continuous wave frequency during communication.

A twenty-second aspect of the present invention is the contactless communication medium of any one of the sixteenth to twenty-first aspects, wherein at least part of the planar coil antenna of the IC module is provided, via the insulating layer, directly above the through hole of the metal plate in which the at least one metal foil is provided on the film substrate.

A twenty-third aspect of the present invention is the contactless communication medium of any one of the sixteenth to twenty-second aspects, wherein the insulating layer includes the film substrate.

A twenty-fourth aspect of the present invention is a contactless communication medium including an IC module that includes a planar coil antenna and an IC chip, and a plurality of metal plates in each of which a metal plate edge portion serves as an antenna, wherein in plan view of a plate surface of the plurality of metal plates, each of the metal plates has a through hole in which the IC module fits or with which the IC module overlaps, and a slit that extends from the through hole toward the metal plate edge portion, the plurality of metal plates are laminated via an insulating layer, the plurality of metal plates include a first metal plate in which a peripheral portion of at least one of the through hole and the slit overlaps with or is close to at least part of the planar coil antenna of the IC module to serve as an antenna, and a second metal plate that is laminated adjacent to the first metal plate, in at least one position, the first metal plate and the second metal plate are physically connected to each other, or are electrically connected to each other at a low impedance of 30Ω or less at a communication frequency, and the second metal plate extends across the slit of the first metal plate in plan view of the first metal plate, and adds electrostatic capacitance between portions of the slit of the first metal plate.

A twenty-fifth aspect of the present invention is the contactless communication medium of the twenty-fourth aspect, wherein the slit of one of the plurality of metal plates extends from the through hole in a direction different from a direction in which the slit of another one of the plurality of metal plates extends from the through hole, the one of the plurality of metal plates and the another one of the plurality of metal plates are provided so that the slit of the one of the plurality of metal plates and the slit of the another one of the plurality of metal plates do not mostly overlap with each other in plan view, the one of the plurality of metal plates and the another one of the plurality of metal plates have a first region that is defined by the slits and the through holes of the one of the plurality of metal plates and the another one of the plurality of metal plates, and a second region that is not defined by the slits and the through holes, and in one of the first region and the second region, the first metal plate and the second metal plate are physically connected to each other, or are electrically connected to each other at a low impedance of 30Ω or less at a communication frequency.

A twenty-sixth aspect of the present invention is the contactless communication medium of the twenty-fifth aspect, wherein the first metal plate and the second metal plate are physically or electrically connected to each other in the first region or the second region, whichever has a smaller area in plan view.

A twenty-seventh aspect of the present invention is the contactless communication medium of the twenty-sixth aspect, wherein an area ratio of the first region to the second region is smaller than at least 0.25.

A twenty-eighth aspect of the present invention is the contactless communication medium of any one of the twenty-fourth to twenty-seventh aspects, wherein the IC module is provided in the through hole of one of the plurality of metal plates, at least part of a peripheral portion of the through hole of another one of the plurality of metal plates overlaps with the planar coil antenna of the IC module via an insulator or a void, and the through hole of the one of the plurality of metal plates has a same dimension as the IC module or a larger dimension than the IC module to allow the IC module to fit in the through hole of the one of the plurality of metal plates in plan view.

A twenty-ninth aspect of the present invention is the contactless communication medium of any one of the twenty-fourth to twenty-seventh aspects, wherein the IC module fits in the through hole of one of the plurality of metal plates, at least part of a peripheral portion of the through hole of the one metal plate overlaps with the planar coil antenna of the IC module, and the through hole of a different one of the plurality of metal plates overlaps with at least part of the planar coil antenna in plan view.

A thirtieth aspect of the present invention is the contactless communication medium of any one of the twenty-fourth to twenty-ninth aspects, wherein the insulating layer interposed between the plurality of metal plates has a thickness of 100 um or less.

A thirty-first aspect of the present invention is the contactless communication medium of the thirtieth aspect, wherein the insulating layer has a relative permittivity of 1.5 or more.

A thirty-second aspect of the present invention is the contactless communication medium of the thirtieth or thirty-first aspect, wherein the insulating layer is formed by laminating an insulation sheet having an adhesion function with the plurality of metal plates, followed by pressing.

A thirty-third aspect of the present invention is the contactless communication medium of the thirtieth or thirty-first aspect, wherein the insulating layer is formed by applying a resin having an adhesion function to the plurality of metal plates, followed by pressing.

A thirty-fourth aspect of the present invention is the contactless communication medium of the thirty-third aspect, wherein the resin is applied to the plurality of metal plates by screen printing.

A thirty-fifth aspect of the present invention is the contactless communication medium of any one of the twenty-fourth to thirty-fourth aspects, wherein part of the insulating layer is composed of a conductive member.

A thirty-sixth aspect of the present invention is the contactless communication medium of the thirty-fifth aspect, wherein the conductive member is a conductive resin, an anisotropic conductive resin, a metal flake, solder, a resin ball having a surface on which a metal layer is provided, or a spring having a surface on which a metal layer is provided.

A thirty-seventh aspect of the present invention is the contactless communication medium of any one of the twenty-fourth to thirty-sixth aspects, wherein the metal plates have a same shape as an IC card that is the contactless communication medium, and effective electrostatic capacitance formed by the second metal plate that extends across the slit of the first metal plate is 1 nF or more and 20 nF or less.

A thirty-eighth aspect of the present invention is the contactless communication medium of the thirty-sixth or thirty-seventh aspect, wherein the first metal plate and the second metal plate are electrically connected to each other at a low impedance of 30Ω or less at a communication frequency in a region in which the first metal plate and the planar coil antenna overlap with each other.

A thirty-ninth aspect of the present invention is the contactless communication medium of any one of the thirty-sixth to thirty-eighth aspects, wherein the first metal plate and the second metal plate are electrically connected to each other at a low impedance of 30Ω or less at a communication frequency in the through hole of the first metal plate, and the first metal plate and the second metal plate are electrically or physically connected to each other in the through hole by a connection method such as application of a conductive material, welding, plating, pressure welding, screwing, or soldering.

A fortieth aspect of the present invention is the contactless communication medium of any one of the twenty-fourth to thirty-ninth aspects, wherein the plurality of metal plates include three metal plates, and when an intermediate metal plate of the three metal plates is viewed as an antenna, of the three metal plates, the metal plates above and below the intermediate metal plate serve to form a flat plate capacitance between portions of the slit of the intermediate metal plate, and one of the metal plates above and below the intermediate metal plate is physically connected to part of the intermediate metal plate or is electrically connected to part of the intermediate metal plate at a low impedance of 30Ω or less at a communication frequency to form a flat plate capacitance between portions of the slit of the intermediate metal plate.

A forty-first aspect of the present invention is the contactless communication medium of the fortieth aspect, wherein in at least part of a peripheral portion of the through hole, the intermediate metal plate overlaps with the planar coil antennae via an insulator or a void, one of the metal plates above and below the intermediate metal plate serves to form, between portions of the slit of the intermediate metal plate, flat plate series capacitance as two flat plate capacitors connected in series, and another one of the metal plates is physically connected to part of the intermediate metal plate or is electrically connected to part of the intermediate metal plate at a low impedance of 30Ω or less at a communication frequency to serve to form a flat plate capacitance between portions of the slit of the intermediate metal plate.

A forty-second aspect of the present invention is the contactless communication medium of any one of the twenty-fourth to forty-first aspects, wherein the plurality of metal plates have a same shape as an IC card that is the contactless communication medium, and a resonance frequency of the first metal plate and the second metal plate laminated while the IC module is removed is more than 13.56 MHz and 25 MHz or less.

A forty-third aspect of the present invention is the contactless communication medium of any one of the twenty-fourth to forty-second aspects, wherein an absolute value of an imaginary part of an impedance at a communication frequency of the IC chip of the IC module or at a continuous wave frequency (13.56 MHz) is larger than an absolute value of an imaginary part of an impedance measured for a module alone of the planar coil antenna of the IC module.

A forty-fourth aspect of the present invention is the contactless communication medium of any one of the twenty-fourth to forty-third aspects, wherein an absolute value of an imaginary part of an impedance at a communication frequency of the IC chip of the IC module or at a continuous wave frequency is larger than an absolute value of an imaginary part of an impedance while the planar coil antenna of the IC module is attached to the peripheral portion of the through hole of the first metal plate, and the second metal plate is not present.

A forty-fifth aspect of the present invention is the contactless communication medium of any one of the twenty-fourth to forty-fourth aspects, wherein the plurality of metal plates include a metal plate in which at least one metal foil is provided on one or both surfaces of a film substrate made of a resin.

A forty-sixth aspect of the present invention is the contactless communication medium of the forty-fifth aspect, wherein another metal layer is laminated, via the insulating layer, on the film substrate provided with the at least one metal foil.

A forty-seventh aspect of the present invention is the contactless communication medium of the forty-fifth or forty-sixth aspect, wherein a metal foil pattern of the at least one metal foil has an outer dimension smaller than an outer dimension of the film substrate, and the at least one metal foil is laminated so that the metal foil pattern is located inside the film substrate in plan view.

A forty-eighth aspect of the present invention is the contactless communication medium of the forty-fifth or forty-sixth aspect, wherein a metal foil pattern of the at least one metal foil has a through hole larger in size than a through hole of the film substrate, and the at least one metal foil is laminated so that the through hole of the film substrate is located inside the through hole of the metal foil pattern.

A forty-ninth aspect of the present invention is the contactless communication medium of any one of the forty-fifth to forty-eighth aspects, wherein the film substrate has a through hole that is located in a portion of the film substrate corresponding to a through hole of a metal foil pattern of the at least one metal foil and that has a same shape as the through hole of the metal foil pattern or a smaller size than the through hole of the metal foil pattern.

A fiftieth aspect of the present invention is the contactless communication medium of any one of the forty-fifth to forty-ninth aspects, wherein the at least one metal foil is made of copper or aluminum, and the at least one metal foil has a thickness larger than a skin depth at a continuous wave frequency during communication.

A fifty-first aspect of the present invention is the contactless communication medium of any one of the forty-fifth to fiftieth aspects, wherein at least part of the planar coil antenna of the IC module is provided, via the insulating layer, directly above the through hole of the metal plate in which the at least one metal foil is provided on the film substrate.

A fifty-second aspect of the present invention is the contactless communication medium of any one of the forty-fifth to fifty-first aspects, wherein the insulating layer includes the film substrate.

A fifty-third aspect of the present invention is the contactless communication medium of any one of the forty-fifth to fifty-second aspects, wherein in the metal plate in which the at least one metal foil is provided on the film substrate, the at least one metal foil includes a plurality of metal foils, and the plurality of metal foils provided on both surfaces on a front and back of the film substrate are electrically connected to each other by a method such as pressure bonding, pressure welding, or welding.

A fifty-fourth aspect of the present invention is the contactless communication medium of the fifty-third aspect, wherein when the plurality of metal plates are laminated, one or more of the plurality of metal plates that overlap with a crimped portion of the metal plate in which the plurality of metal foils are provided on the film substrate have a recessed portion or a through hole for avoiding the crimped portion.

Advantageous Effects of the Invention

A contactless communication medium of the present invention achieves larger electrostatic capacitance with a simple structure.

DETAILED DESCRIPTION

Figure 1:
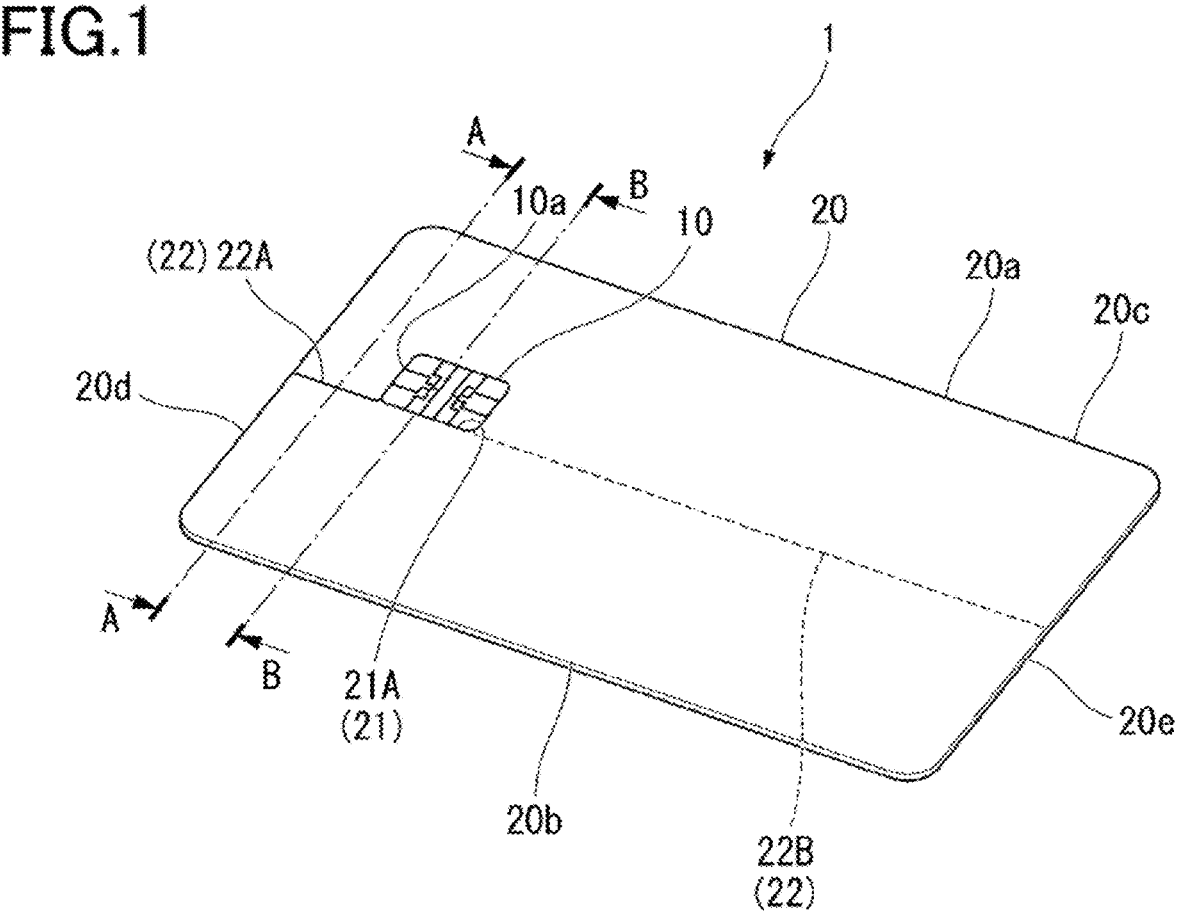
FIG. 1 is a perspective view of an IC card of a first embodiment of the present invention viewed obliquely from a surface of the IC card.
Figure 2:
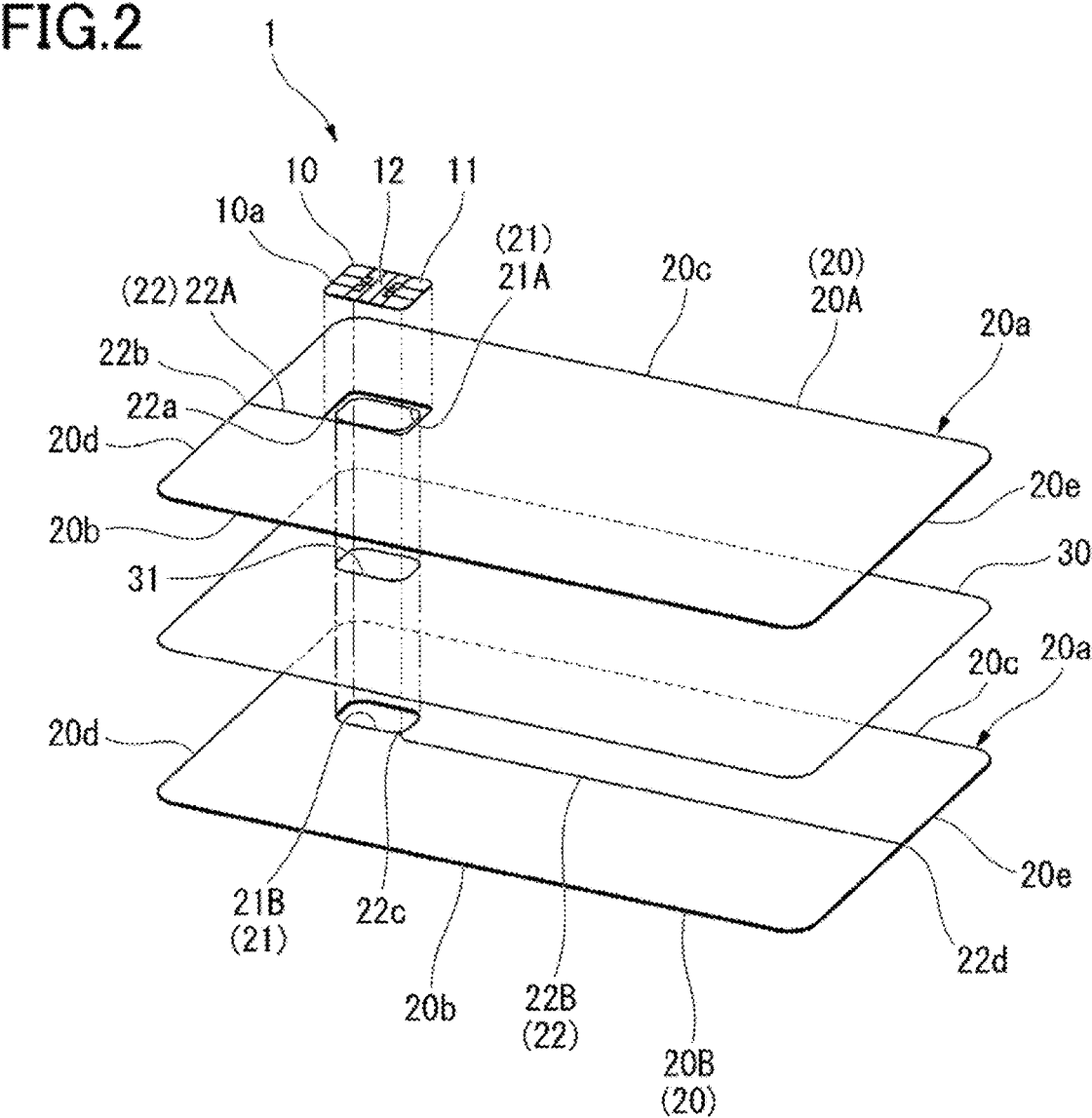
FIG. 2 is an exploded perspective view of the IC card shown in FIG. 1.
Figure 3A:
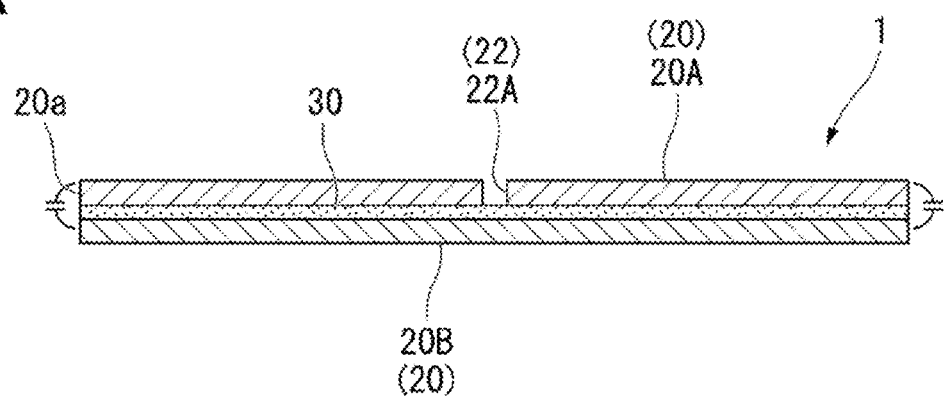
FIG. 3A is a cross-sectional view taken along line A-A in FIG. 1 and shows a cross section passing through a slit portion.
Figure 3B:
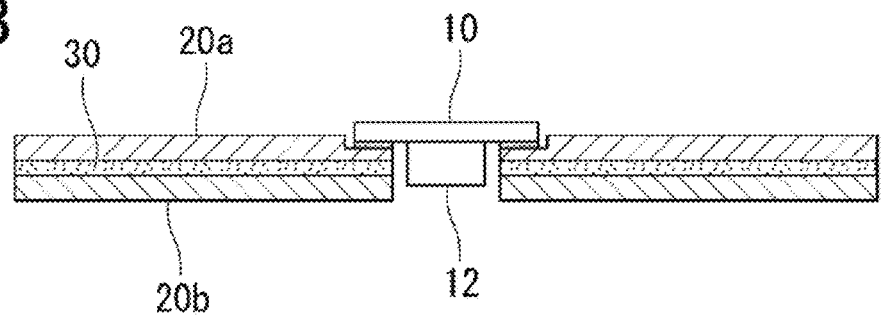
FIG. 3B is a cross-sectional view taken along line B-B in FIG. 1 and shows a cross section passing through a through hole portion.

Embodiments of the present invention will be described with reference to the drawings.

First Embodiment

As shown in FIGS. 1 to 3B, an IC card (contactless communication medium) 1 according to the present embodiment includes an IC module 10 that includes a planar coil antenna 11 and an IC chip 12, and metal plates 20 (coupling frames (CFs)) that house the IC module 10 and in each of which an outer peripheral portion 20a (metal plate edge portion) serves as an antenna.

In the following description of the present embodiment, a major surface of the IC card 1 refers to a surface of the IC card 1 on the side on which the IC module 10 is housed, and a back surface of the IC card 1 refers to a surface of the IC card 1 opposite to the major surface.

In the following description of the present embodiment, all metal plates are collectively denoted by reference sign 20, a metal plate that serves as an antenna is referred to as a first metal plate and denoted by reference sign 20A, and a metal plate that is different from the first metal plate 20A and serves as a parallel flat plate capacitor (described later) is referred to as a second metal plate and denoted by reference sign 20B.

In plan view of the surface of the IC module 10 on the antenna side, each of the metal plates 20 (20A, 20B) has a through hole 21 in which the IC module 10 fits or with which the IC module 10 overlaps, and a slit 22 that extends from the through hole 21 toward the outer peripheral portion 20a.

At least two or more (two in the present embodiment) metal plates 20 are laminated via an insulating layer 30 that is composed of an adhesive layer, and a peripheral portion of the through hole 21 of the metal plates 20 overlaps with or is close to at least part of the planar coil antenna 11 of the IC module 10 to serve as an antenna. That is, in the contactless communication medium 1 of the present embodiment, the first metal plate 20A, the adhesive layer 30, and the second metal plate 20B are laminated in this order.

The second metal plate 20B laminated adjacent to the first metal plate 20A extends across the slit 22 of the first metal plate 20A in plan view, and adds, between portions of the slit 22, electrostatic capacitance as two flat plate capacitors connected in series. The metal plates 20 serve as a coil antenna that is wound with a single turn along the outer peripheral portion 20a to form a loop circuit. The coil antenna of the metal plates 20 is electromagnetically connected to the planar coil antenna 11 of the IC module 10.

The metal plates 20 have a rectangular shape elongated in a single direction in plan view. The through holes 21 of the metal plates 20 have a substantially rectangular shape, and are located at a position in the center of the metal plates 20 in the lateral direction and closer to one end of the metal plates 20 in the longitudinal direction.

The metal plates 20 are made of, for example, a conductive metal material such as stainless steel or a titanium alloy. The metal plates 20 have a thickness of, for example, 100 µm to 900 µm.

In the following description, edge portions of each of the metal plates 20 along the major axis direction are referred to as long side portions 20b and 20c, and edge portions of each of the metal plates 20 along the minor axis direction are referred to as short side portions 20d and 20e. Furthermore, of the short side portions, the edge portion closer to the IC module 10 is referred to as a first short side portion 20d, and the edge portion opposite to the first short side portion 20d in the major axis direction is referred to as a second short side portion 20e.

In the first metal plate 20A, the peripheral portion of the through hole 21 planarly overlaps with at least part (connection terminal) of the coil antenna 11 of the IC module 10, thus allowing the first metal plate 20A to be electrically connected to the IC module 10 to serve as an antenna.

The through holes 21 have a rectangular shape in plan view. Examples of the shape of the through holes 21 include a circle, a square, an ellipse, and a rectangle. However, the shape of the through holes 21 is not specifically limited as long as the through holes 21 have an opening area that allows the metal plates 20 to be electrically connected to the IC module 10. The through holes 21 may be formed, for example, by laser processing, cutting, or punching.

A first through hole 21A of the first metal plate 20A is set to have an outer shape smaller than the outer shape of the IC module 10 so that an outer periphery 10a of the IC module 10 overlaps with the first through hole 21A in plan view. That is, at least part of a metal surface of the first metal plate 20A around the first through hole 21A overlaps in plan view with the planar coil antenna 11 of the IC module 10 via an insulating layer or a void.

A second through hole 21B of the second metal plate 20B overlaps with the first through hole 21A of the first metal plate 20A via the insulating layer 30 in plan view.

In the first metal plate 20A, a first slit 22A extends along the major axis direction from the through hole 21 to the first short side portion 20d. One end 22a of the first slit 22A on the first through hole 21A side is connected to a corner portion of the first through hole 21A closer to the first short side portion 20d, and the other end 22b of the first slit 22A is connected to the outer peripheral portion 20a while the end 22b is open to the outer peripheral portion 20a. The first slit 22A extends from the first through hole 21A in a direction different from the direction in which a second slit 22B (described later) of another one (the second metal plate 20B in this case) of the metal plates extends from the second through hole 21B.

The first slit 22A is set to have a width of, for example, approximately 50 µm to 0.5 mm.

In the second metal plate 20B, the second slit 22B extends along the major axis direction from the through hole 21 to the second short side portion 20e. One end 22c of the second slit 22B on the second through hole 21B side is connected to a corner portion of the second through hole 21B closer to the second short side portion 20e, and the other end 22d of the second slit 22B is connected to the outer peripheral portion 20a while the end 22d is open at the outer peripheral portion 20a. The second slit 22B extends from the second through hole 21B in a direction different from the direction in which the first slit 22A of the first metal plate 20A extends from the first through hole 21A.

The second slit 22B is set to have a width of, for example, approximately 50 µm to 0.5 mm.

The two slits 22 (22A, 22B) of the two metal plates 20 (20A, 20B) adjacent to each other in the lamination direction are provided so that the slits 22 substantially do not overlap with each other in plan view of the laminate and are located on the same line. A straight line (line segment) on which the two slits 22 (22A, 22B) are located is denoted by reference sign K.

The straight line (line segment) K formed by the slits 22 (22A, 22B) of the respective two metal plates 20 (20A, 20B) is located at a position at which the first metal plate 20A is divided into two regions having the same area.

The insulating layer 30 constituting an insulator is preferably set to have a thickness of 50 um or less, and is interposed between the first metal plate 20A and the second metal plate 20B. The insulating layer 30 has a relative permittivity of 1.5 or more.

The insulating layer 30 can be formed by laminating an insulation sheet having an adhesion function with the first metal plate 20A and the second metal plate 20B, followed by pressing.

Alternatively, the insulating layer 30 can be formed by applying a resin having an adhesion function to the surfaces of the first metal plate 20A and the second metal plate 20B, followed by pressing. Furthermore, the insulating layer 30 may be formed by applying a resin having an adhesion function to the first metal plate 20A and the second metal plate 20B by screen printing.

Figure 4:
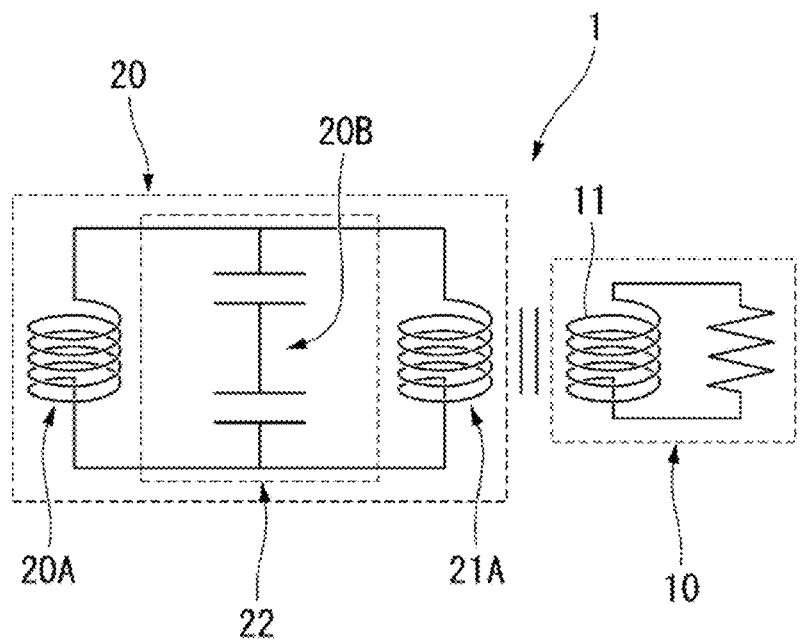
FIG. 4 is an equivalent circuit diagram of the IC card of the first embodiment.

FIG. 4 is an equivalent circuit diagram illustrating the principles of the contactless communication medium 1 of the first embodiment.

A high-frequency signal (not shown) generated in a transmission/reception circuit of a reader/writer (contactless external device) (not shown) induces a high-frequency magnetic field in the planar coil antenna 11 of the IC module 10. The high-frequency magnetic field is emitted as magnetic energy to a space.

In this case, when the contactless communication medium 1 is located in the high-frequency magnetic field, the high-frequency magnetic field causes a current to flow through a parallel resonant circuit composed of the antenna of the first metal plate 20A. A signal received by the resonant circuit is transmitted to the IC chip 12 by electromagnetic coupling between the antenna coil and the planar coil antenna 11 of the IC module 10.

The absolute value of the imaginary part of an impedance at the communication frequency of the IC chip 12 of the IC module 10 or the continuous wave frequency (13.56 MHz) is set to be larger than the absolute value of the imaginary part of an impedance measured for a module alone of the planar coil antenna 11 of the IC module 10.

Furthermore, the absolute value of the imaginary part of an impedance at the communication frequency of the IC chip 12 of the IC module 10 or the continuous wave frequency is larger than the absolute value of the imaginary part of an impedance while the planar coil antenna 11 of the IC module 10 is attached to the peripheral portion of the first through hole 21A of the first metal plate 20A, and the second metal plate 20B is not present.

As shown in FIG. 1, in the IC card 1 of the present embodiment, the metal plates 20 (20A, 20B) are set to have the same outer shape as the IC card 1. That is, the outer shape of the metal plates 20 (20A, 20B) is a card shape.

Figure 5:
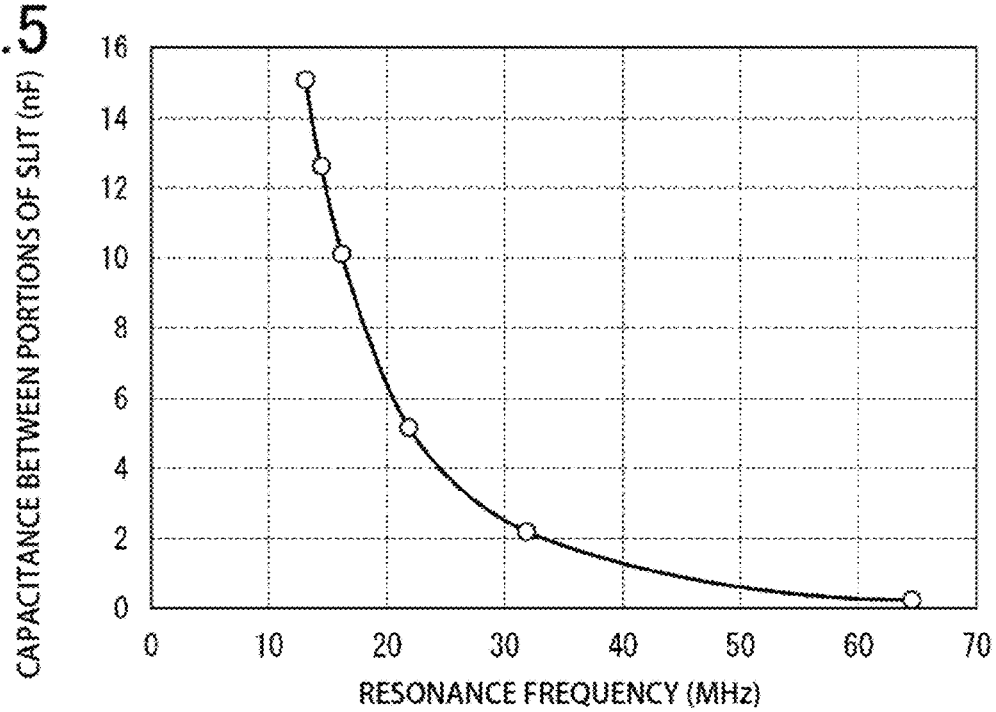
FIG. 5 is a diagram showing the relationship between the resonance frequency and the capacitance between portions of a slit.

FIG. 5 shows the relationship between the resonance frequency (MHz) and the capacitance (nF) between portions of the slit. The effective electrostatic capacitance formed between portions of the first slit 22A of the first metal plate 20A by the second metal plate 20B is 1 nF or more and 20 nF or less.

Figure 6:
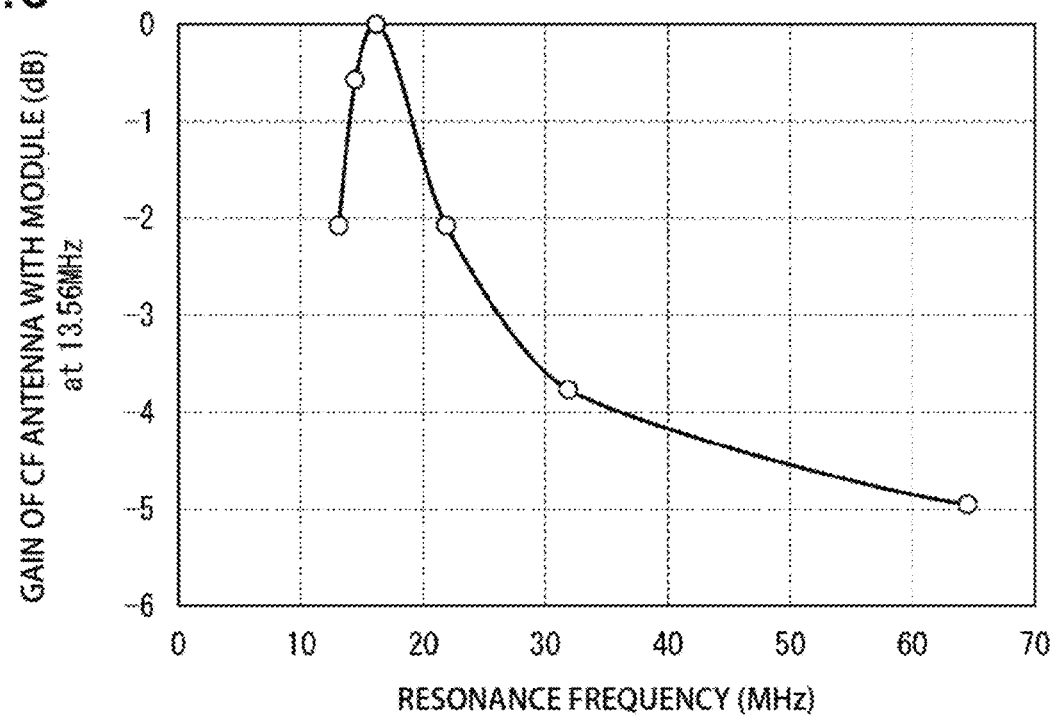
FIG. 6 is a diagram showing the relationship between the resonance frequency and the gain of an antenna provided with a module.
Figure 7:
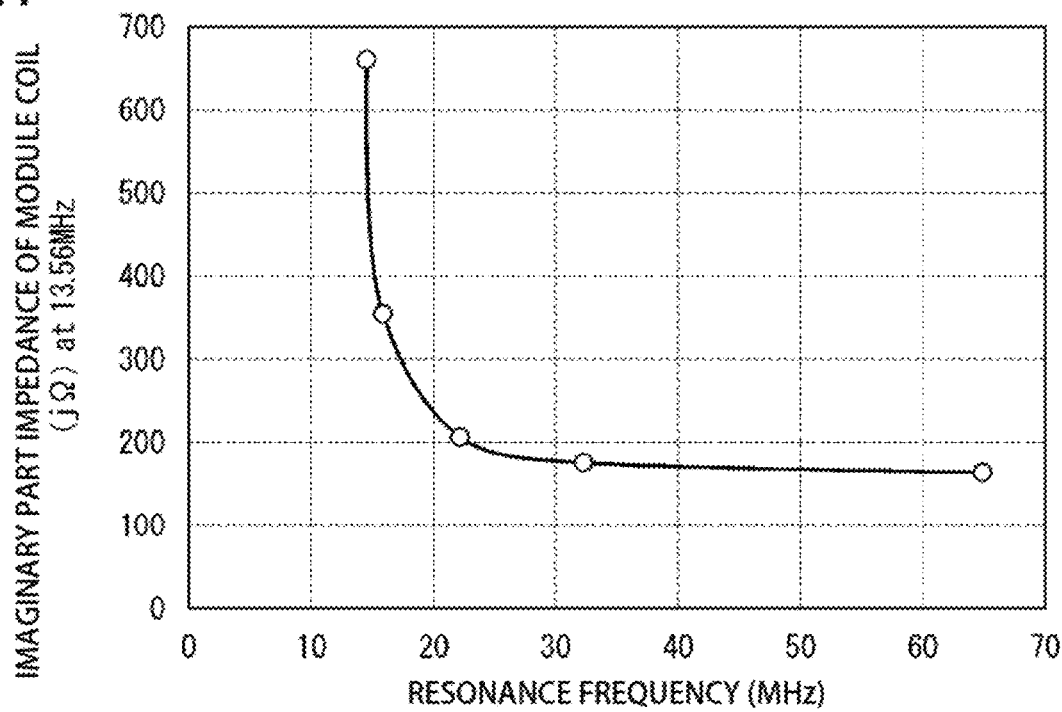
FIG. 7 is a diagram showing the relationship between the resonance frequency and the imaginary part of an impedance of a module coil.

FIG. 6 shows the relationship between the resonance frequency (MHz) and the relative gain (dB) of the metal plate 20 (the first metal plate 20A) including the IC module 10. FIG. 7 shows the correlation between the resonance frequency (MHz) of the first metal plate 20A and the imaginary part of an impedance of the module coil (after attachment to the first metal plate 20A).

In the IC card 1, the resonance frequency of the metal plates 20A and 20B laminated while the IC module 10 is removed is set to be more than 13.56 MHz and 25 MHz or less. As shown in FIG. 7, as the resonance frequency approaches 13.56 MHz from a range higher than 13.56 MHz, the imaginary part of an impedance of the module coil (after attachment to the first metal plate 20A) is increased.

Next, effects of the IC card 1 described above will be described in detail with reference to the drawings.

In the present embodiment, the IC card (contactless communication medium) 1 includes the IC module 10 that includes the planar coil antenna and the IC chip 12, and the plurality of metal plates 20 in each of which the outer peripheral portion 20a serves as an antenna. In plan view, each of the metal plates 20 has the through hole 21 in which the IC module 10 fits or with which the IC module 10 overlaps, and the slit 22 that extends from the through hole 21 toward the outer peripheral portion 20a. At least two or more metal plates 20 are laminated via the insulating layer 30. The metal plates 20 include the first metal plate 20A in which the peripheral portion of at least one of the through hole 21 and the slit 22 overlaps with or is close to at least part of the planar coil antenna 11 of the IC module 10 to serve as an antenna. The second metal plate 20B extends across the slit 22A of the first metal plate 20A in plan view of the first metal plate 20A, and adds, between portions of the slit 22A of the first metal plate 20A, electrostatic capacitance as two flat plate capacitors connected in series.

This makes it possible to add electrostatic capacitance between portions of the slit 22A of the first metal plate 20A by a simple method that does not require processing such as connecting a capacitor element between portions of the slit 22A of the first metal plate 20A and does not hinder the card manufacturing process. Addition of electrostatic capacitance between portions of the slit 22 can reduce the self-resonant frequency of the first metal plate 20A, making it possible to adjust the self-resonant frequency to improve the communication performance at a desired communication frequency.

In the present embodiment, the slit 22A of at least one (the first metal plate 20A in this case) of the laminated plurality of metal plates 20 extends from the through hole 21A in a direction different from the direction in which the slit 22B of the other metal plate 20 (the second metal plate 20B in this case) extends from the through hole 21B. The metal plate 20A and the metal plate 20B are provided so that, in plan view, the slits 22A and 22B do not overlap but are located on the same line. Furthermore, the straight line formed by the slit 22A of the metal plate 20A and the slit 22B of the metal plate 20B is located at a position at which the area of each of the metal plates 20 is divided into two.

This can maximize the electrostatic capacitance formed between portions of the slit 22 of the metal plate 20, and lamination of the plurality of metal plates 20 having the slits 22 located at different positions and extending in different directions allows the IC card 1 to have a higher mechanical strength against stress caused by twisting or bending.

In the present embodiment, at least part of the metal surface of at least one of the laminated plurality of metal plates 20 around the through hole 21 overlaps in plan view with the planar coil antenna of the IC module 10 via an insulator or a void. Thus, the metal plate 20 is electrically connected to the IC module 10, allowing the contactless communication medium to achieve higher communication performance.

In the present embodiment, the insulating layer interposed between the laminated metal plates 20 has a thickness of 100 um or less. This enables the amount of electrostatic capacitance formed between portions of the slit 22 of the metal plate 20 to be set so that the self-resonant frequency of the laminated metal plates 20 is significantly changed.

In the present embodiment, the insulating layer 30 has a relative permittivity of 1.5 or more. This enables the amount of electrostatic capacitance formed between portions of the slit 22 of the metal plate 20 to be more efficiently set so that the self-resonant frequency of the laminated metal plates 20 is significantly changed.

In the present embodiment, when the insulating layer 30 is formed by laminating an insulation sheet having an adhesion function with the metal plates, followed by pressing, it is possible to easily form a card by laminating the metal plates 20 using a typical card manufacturing process.

In the present embodiment, when the insulating layer 30 is formed by applying a resin having an adhesion function to the metal plates 20, followed by pressing, it is possible to easily form a card by laminating the metal plates 20 using a typical card manufacturing process.

In the present embodiment, the resin may be applied to the metal plates 20 by screen printing. This configuration not only makes it possible to easily form a card by laminating the metal plates 20 using a typical card manufacturing process but also allows the insulating layer 30 to have a thickness of approximately several micrometers, thus enabling a smaller number of laminated metal plates 20 to form a larger electrostatic capacitance between portions of the slit 22.

When the metal plates 20 have the same shape as the IC card 1 and the effective electrostatic capacitance formed by the second metal plate 20B that serves as a parallel flat plate capacitor and extends across the slit 22A of the first metal plate 20A is 1 nF or more and 20 nF or less, due to the electrostatic capacitance formed between portions of the slit 22A of the first metal plate 20A, the self-resonant frequency of the laminated metal plates 20 can be significantly changed.

When the metal plates 20 have the same shape as the IC card 1 and the resonance frequency of the metal plates 20 laminated while the IC module 10 is removed is more than 13.56 MHz and 25 MHz or less, due to the self-resonant frequency of the laminated metal plates 20, the complex impedance (communication frequency or CW frequency (13.56 MHz)) of both ends (connection terminals) of the coil antenna 11 of the IC module 10 can be significantly changed.

In the present embodiment, the absolute value of the imaginary part of an impedance at the communication frequency of the IC chip 12 of the IC module 10 or the continuous wave frequency (13.56 MHz) can be set to be larger than the absolute value of the imaginary part of an impedance measured for a module alone of the planar coil antenna 11 of the IC module 10. Furthermore, in the present embodiment, the absolute value of the imaginary part of an impedance at the communication frequency of the IC chip 12 of the IC module 10 or the continuous wave frequency can be set to be larger than the absolute value of the imaginary part of an impedance while the planar coil antenna 11 of the IC module 10 is attached to the peripheral portion of the through hole 21 of the first metal plate 20A, and the second metal plate 20B that forms flat plate capacitance is not present.

In the above cases, when the IC module 10 is attached to the laminated metal plates 20, the complex impedance (communication frequency or CW frequency (13.56 MHz)) of both ends (IC connection portions) of the coil antenna 11 of the IC module 10 can be set to be the complex conjugate of the complex impedance of the input terminal of the IC chip 12. This allows the IC card 1 to achieve higher communication performance.

Second Embodiment

Next, an IC card (contactless communication medium) 1B according to a second embodiment will be described with reference to the drawings.

Figure 8:
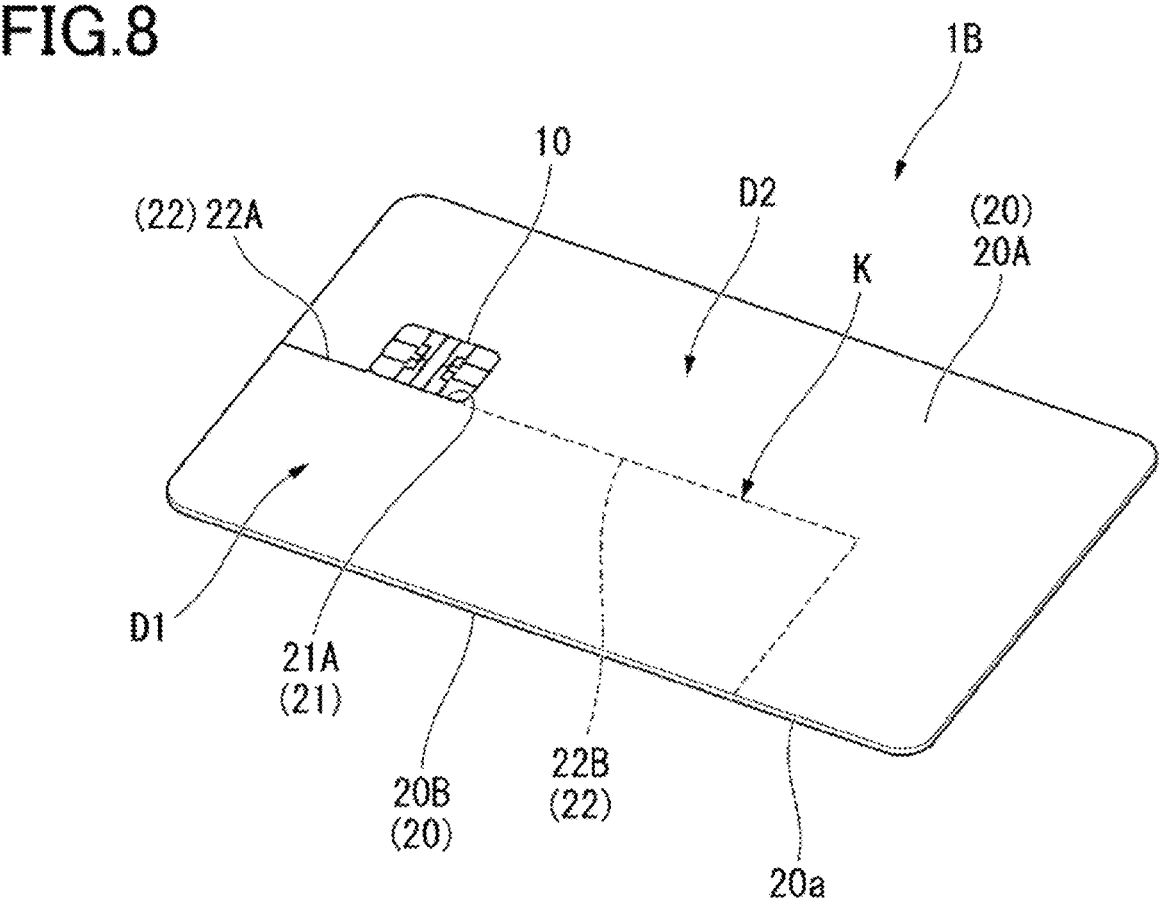
FIG. 8 is a perspective view of an IC card according to a second embodiment viewed obliquely from a surface of the IC card.
Figure 9:
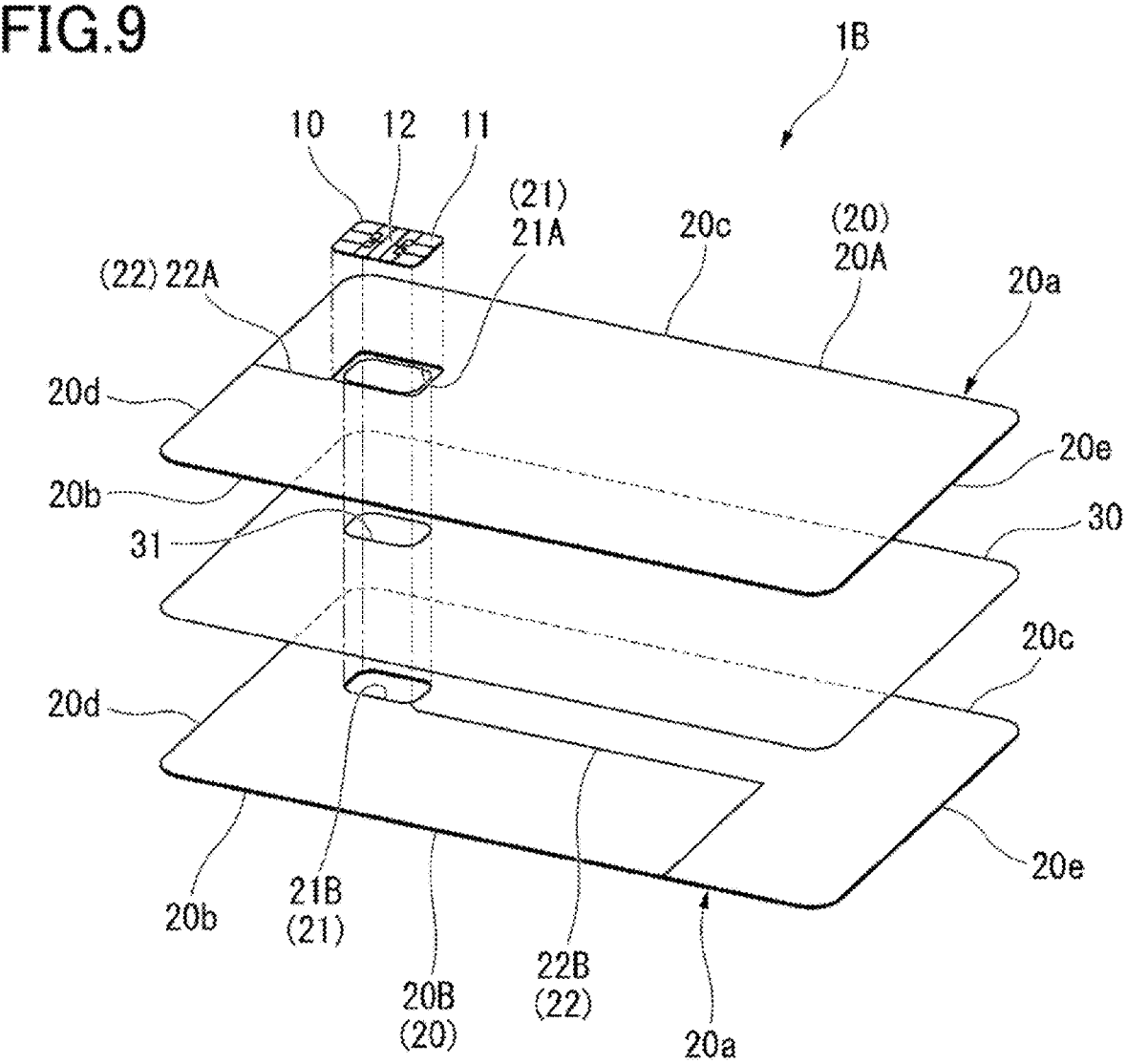
FIG. 9 is an exploded perspective view of the IC card shown in FIG. 8.

As shown in FIGS. 8 and 9, in the IC card 1B according to the second embodiment, the slit 22A of at least one (the first metal plate 20A in this case) of the laminated plurality of metal plates 20 extends from the through hole 21A in a direction different from the direction in which the slit 22B of the other metal plate 20 (the second metal plate 20B in this case) extends from the through hole 21B.

The metal plate 20A and the metal plate 20B are provided so that the slits 22A and 22B do not overlap with each other in plan view. The straight line K (see FIG. 8) formed by the slit 22A of the metal plate 20A and the slit 22B of the metal plate 20B is located at a position at which each of the metal plates 20 is divided into two so that the area ratio between the two is smaller than 1:4. That is, in FIG. 8, the area ratio between a first region D1 and a second region D2 of the metal plates 20 defined by the straight line K is smaller than 1:4. In other words, the area ratio of the first region D1 to the second region D2 is larger than 0.25 (¼).

In the second embodiment, it is possible to prevent the electrostatic capacitance formed between portions of the slit 22 of the metal plate 20 from being excessively small. Furthermore, lamination of the plurality of metal plates 20 having the slits 22 located at different positions and extending in different directions allows the IC card 1B to have a higher mechanical strength against stress caused by twisting or bending.

Third Embodiment

Figure 10:
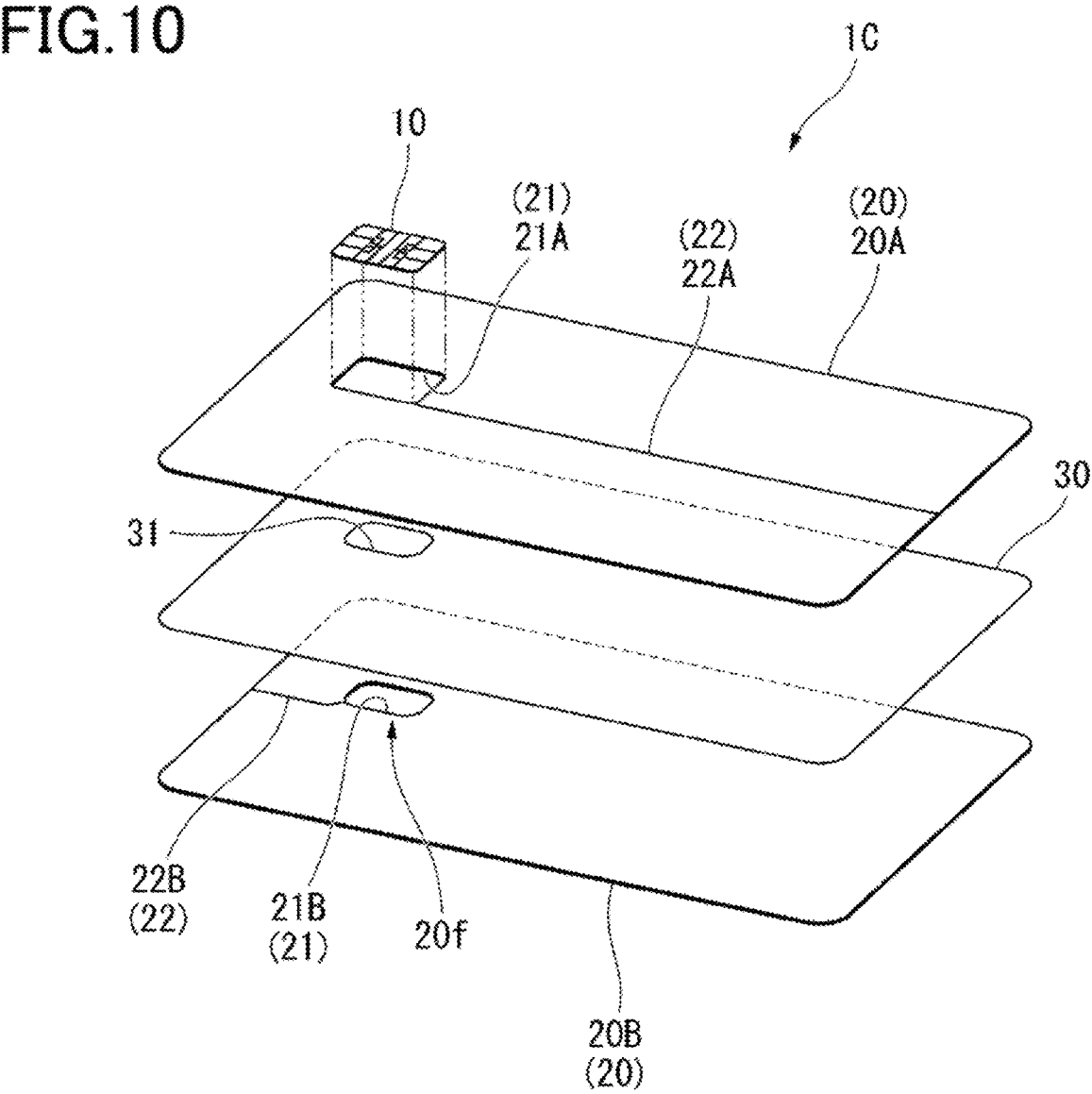
FIG. 10 is a perspective view of an IC card according to a third embodiment viewed obliquely from a surface of the IC card.
Figure 11:
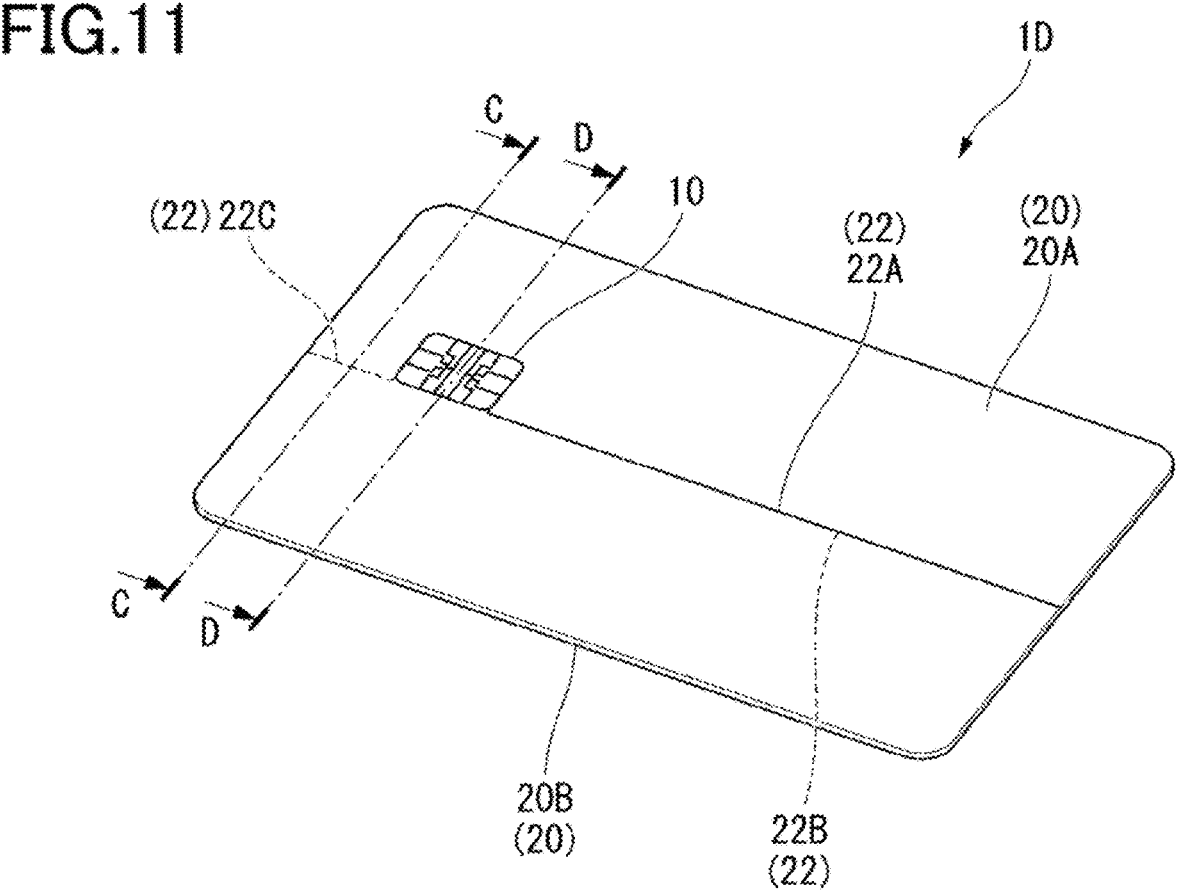
FIG. 11 is a perspective view of an IC card according to a fourth embodiment viewed obliquely from a surface of the IC card.
Figure 12:
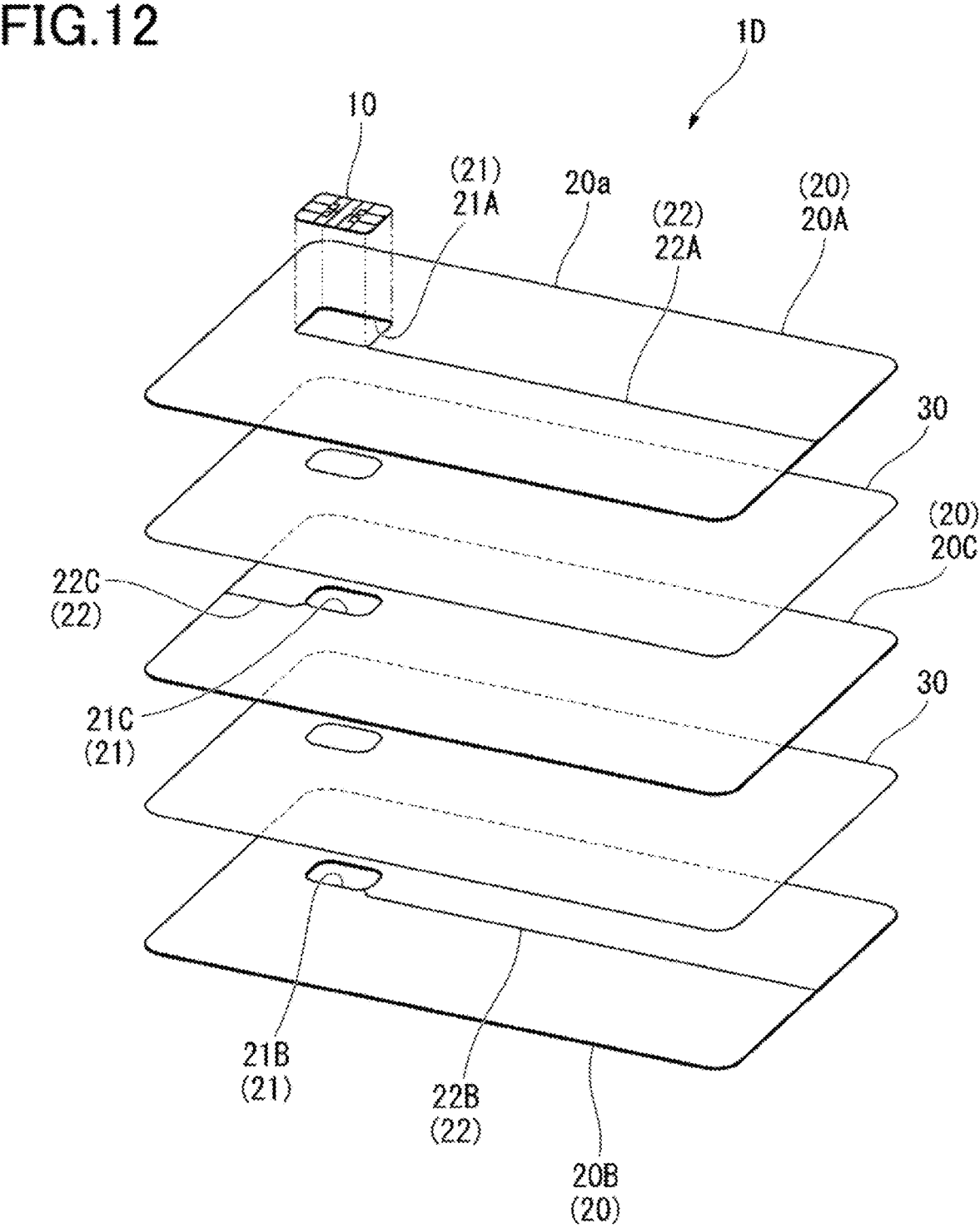
FIG. 12 is an exploded perspective view of the IC card shown in FIG. 11.
Figure 13:
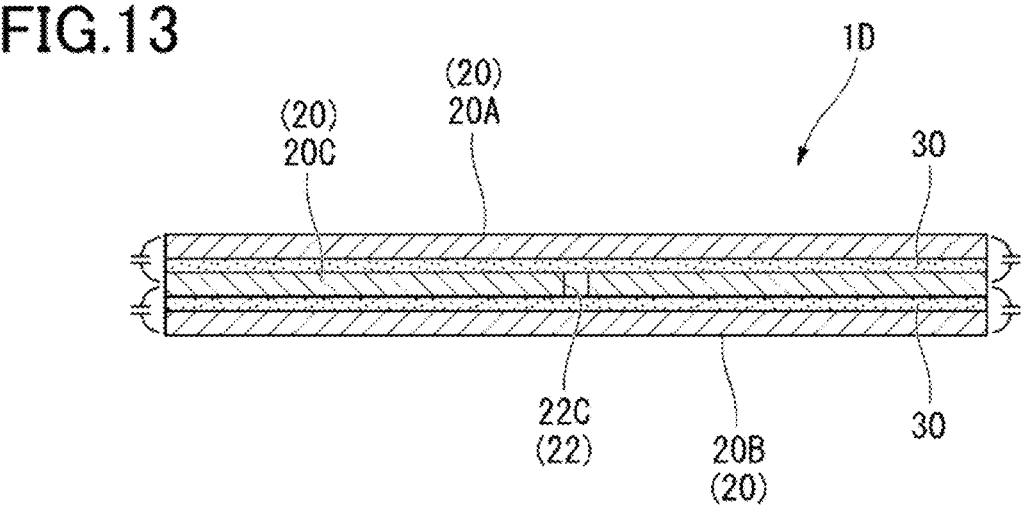
FIG. 13 is a cross-sectional view taken along line C-C in FIG. 11, and shows a cross section passing through a slit portion.
Figure 14:
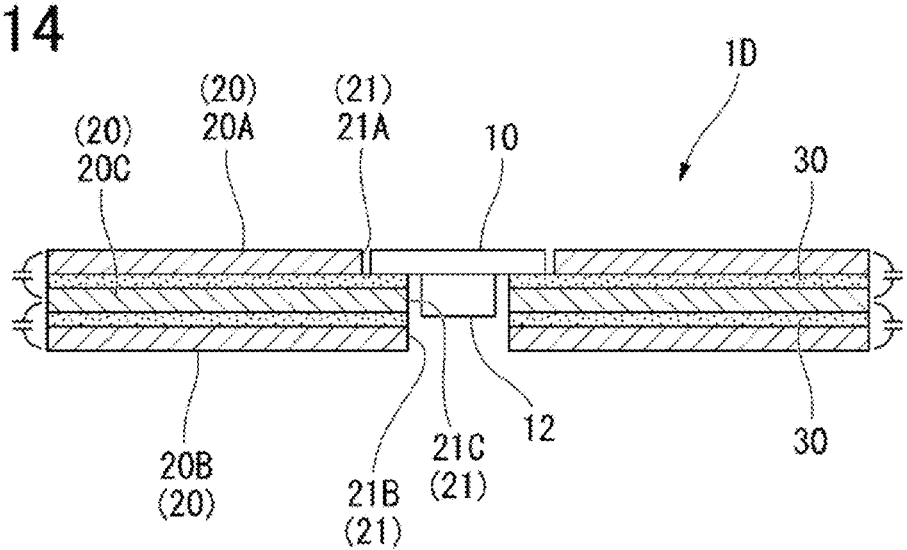
FIG. 14 is a cross-sectional view taken along line D-D in FIG. 11, and shows a cross section passing through a through hole portion.

As shown in FIG. 10, in an IC card (contactless communication medium) 1C according to a third embodiment, at least part of a metal surface 20f of at least one (the second metal plate 20B in this case) of the laminated plurality of metal plates 20 around the through hole 21B overlaps in plan view with the planar coil antenna 11 of the IC module 10 via an insulator or a void (the insulating layer 30 in this case).

That is, the IC module 10 fits in the through hole 21A of the metal plate 20A, which is one of the metal plates 20 (20A, 20B) that overlap with the planar coil antenna 11, and the IC module 10 overlaps with the peripheral portion of the through hole 21B of the metal plate 20B, which is the other metal plate 20.

In the third embodiment, the metal plate 20B is electrically connected to the IC module 10, allowing the contactless communication medium to achieve higher communication performance.

Furthermore, it is possible to maximize the electrostatic capacitance formed between portions of the slit 22 of the metal plate 20. In addition, lamination of the plurality of metal plates 20 having the slits 22 located at different positions and extending in different directions allows the IC card 1C to have a higher mechanical strength against stress caused by twisting or bending. Furthermore, by matching the height of the surface of the metal plate 20A laminated on the metal plate 20B to the height of the contact terminal surface of the IC module 10, it is possible to apply metal-like decoration to the surface of the IC card IC.

Fourth Embodiment

Figure 15:
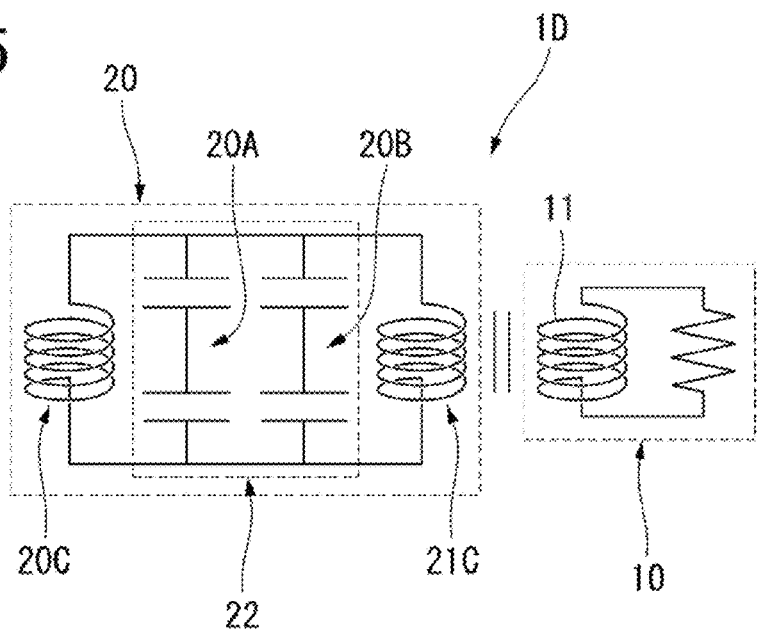
FIG. 15 is an equivalent circuit diagram of the IC card of the fourth embodiment.

As shown in FIGS. 11 to 14, in an IC card (contactless communication medium) 1D according to a fourth embodiment, three metal plates 20 (20A, 20B, 20C) are laminated via insulating layers 30. When an intermediate metal plate 20C of the three metal plates 20 (20A, 20B, 20C) is viewed as an antenna, the metal plates 20 (20A, 20B) above and below the intermediate metal plate 20C add, between portions of a slit 22C of the intermediate metal plate 20C, flat plate series capacitance as two flat plate capacitors connected in series (see FIG. 15).

In the IC card 1D according to the fourth embodiment, electrostatic capacitance between portions of the slit 22C of the intermediate metal plate 20C can be formed on the front and back of the intermediate metal plate 20C, enabling formation of larger electrostatic capacitance.

Furthermore, in the present embodiment, lamination of the plurality of metal plates 20 having the slits 22 located at different positions and extending in different directions allows the IC card 1D to have a higher mechanical strength against stress caused by twisting or bending.

Furthermore, lamination of the plurality of metal plates 20 allows each of the metal plates 20 to serve as an antenna, and also allows the metal plates 20 (20A, 20B) adjacent to the intermediate metal plate 20C to serve as flat plate capacitance forming electrodes. Thus, the self-resonant frequency of the laminated metal plates 20 (20A, 20B) can be adjusted to a lower value.

Fifth Embodiment

Figure 16:
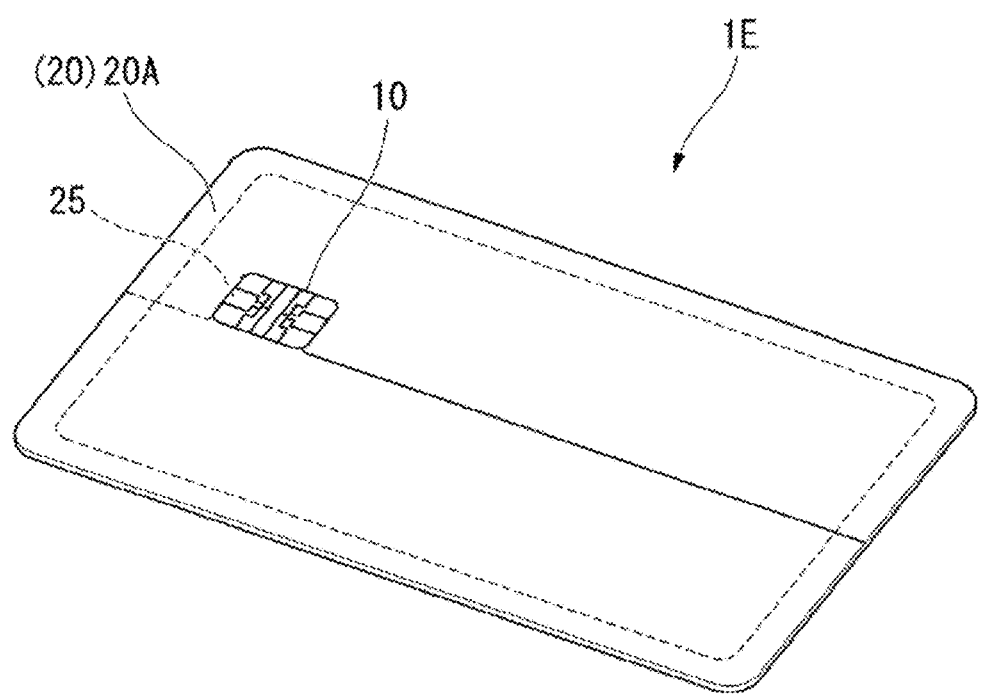
FIG. 16 is a perspective view of an IC card according to a fifth embodiment viewed obliquely from a surface of the IC card.
Figure 17:
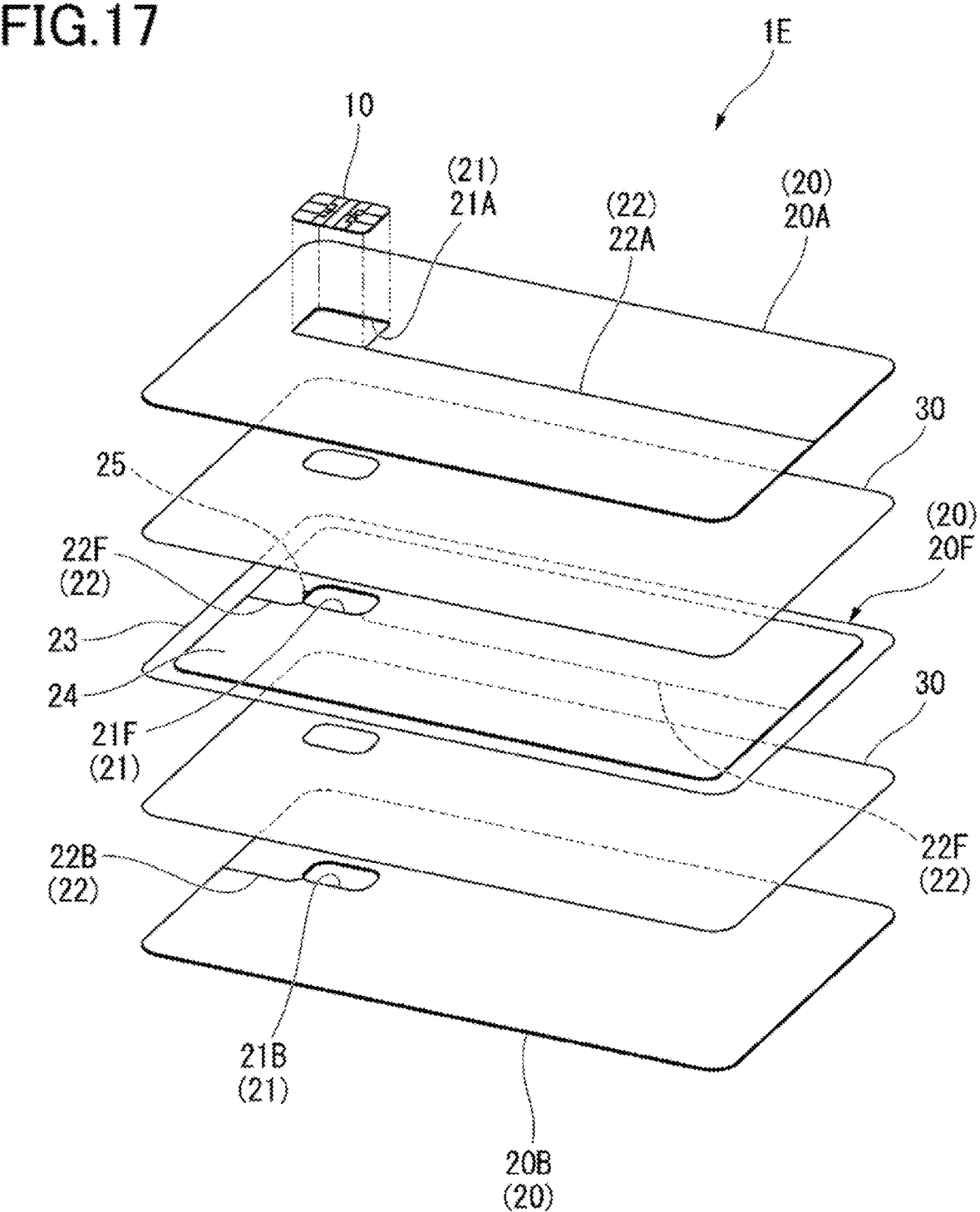
FIG. 17 is an exploded perspective view of the IC card shown in FIG. 16.

In an IC card (contactless communication medium) 1E according to a fifth embodiment shown in FIGS. 16 and 17, the laminated plurality of (three in this case) metal plates 20 (20A, 20B, 20F) include a metal plate in which a metal foil 24 that is made of copper or aluminum is provided on one or both of surfaces 23a and 23b of a film substrate 23 that is made of a resin (an intermediate metal plate 20F may be separately provided on both surfaces of the film substrate 23). That is, in the metal plate 20F in which at least one metal foil 24 is provided on the film substrate 23, the film substrate 23 and the at least one metal foil 24 are laminated together (see FIG. 18). This makes it possible to easily increase the number of laminated metal plates 20. Furthermore, it is possible to easily form a card by laminating the metal plates 20 using a typical card manufacturing process.

The material for forming the film substrate 23 is, for example, a thermoplastic resin having insulating properties. The material for forming the film substrate 23 may be a transparent resin or an opaque resin that has insulating properties and thermoplastic properties. Examples of the material for forming the film substrate 23 include polyester resins such as PEN (polyethylene naphthalate) and PET (polyethylene terephthalate), polycarbonate, polyethylene, polypropylene, and polystyrene.

Figure 18:
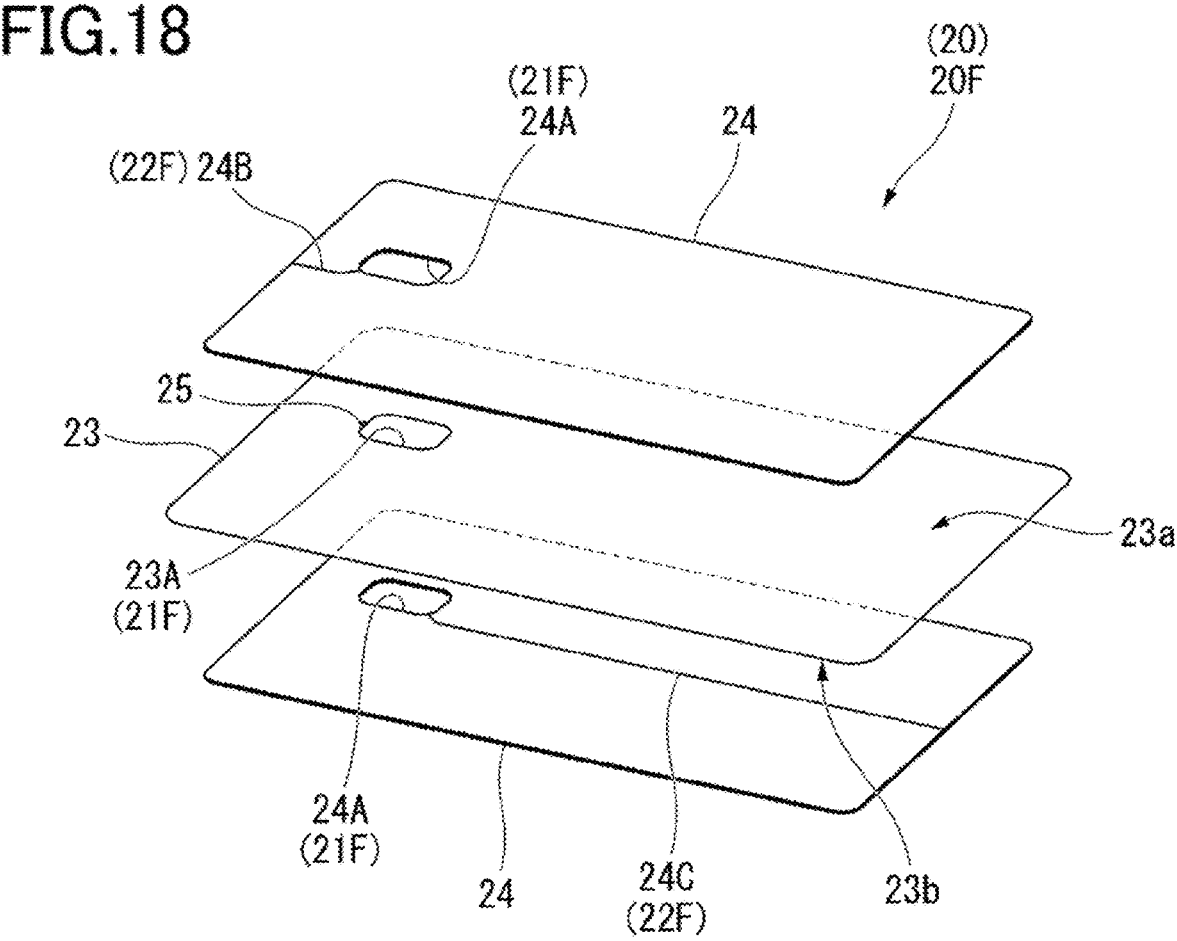
FIG. 18 is an exploded perspective view of an intermediate metal plate in FIG. 17.

As shown in FIG. 18, two metal foils 24 independently provided on the respective surfaces 23a and 23b on the front and back of the film substrate 23 may be electrically connected to each other by a method such as pressure bonding, pressure welding, or welding.

Metal foil patterns of the two metal foils 24 provided on the front and back of the film substrate 23 are set to have an outer dimension smaller than the outer dimension of the film substrate 23, and the two metal foils 24 are laminated so that the metal foil patterns are located inside the outer shape of the film substrate 23 in plan view. Here, the phrase "inside the outer shape of the film substrate 23" means the side on which the film substrate 23 is present. Thus, only a side surface of the film substrate 23 is exposed on a side surface of the IC card IE. This makes it possible to prevent a factor such as deformation of the side surface of the IC card 1E from causing a short circuit between the adjacent metal foils 24 or the adjacent metal plates 20A and 20B and leading to a change in communication performance of the laminated metal plates 20.

The metal foils 24 are set to have a thickness larger than the skin depth at the continuous wave frequency during communication. This leads to less loss of current flowing through the metal foils 24 that are provided on the film substrate 23 and serve as some of the metal plates 20, thus achieving higher communication performance of the IC card 1E that includes the laminated metal plates 20 including the film substrate 23.

Both through holes 24A of the metal foil patterns of the two metal foils 24 provided on the front and back of the film substrate 23 are set to be larger in size than a through hole 23A of the film substrate 23. That is, while the metal foils 24 are laminated on the film substrate 23, the outer shape of the through hole 23A of the film substrate 23 is located inside the through holes 24A of the metal foils 24 in plan view.

In this case as well, only the side surface of the film substrate 23 is exposed on the side surface of the IC card 1E. This makes it possible to prevent a factor such as deformation of the IC card 1E from causing a short circuit between the adjacent metal foils 24 or the adjacent metal plates 20A and 20B and leading to a change in communication performance of the laminated metal plates 20.

The film substrate 23 has a through hole 25 that is located in a portion of the film substrate 23 corresponding to the through holes 24A of the metal foils 24 and that has the same shape as the through holes 24A or a smaller size than the through holes 24A, in plan view. The through hole 25 makes it possible to easily form a card by laminating, using a typical card manufacturing process, the metal plates 20A and 20B having the through holes 21 formed in advance, and the metal plate 20F in which the metal foils 24 having the through holes 24A are connected to the film substrate 23.

As shown in FIGS. 16 and 17, at least part of the planar coil antenna 11 of the IC module 10 housed in the through hole 21A of the metal plate 20A is provided directly above the through hole 25 of the intermediate metal plate 20F via an insulating layer 30.

In this case, the IC module 10 is directly coupled to the metal foils 24 on the film substrate 23; thus as compared with other layers of the metal plates 20 that are often made of SUS metal, a larger amount of current flows through the metal foils 24 on the film substrate 23 that are made of a material such as aluminum or copper and have high electrical conductivity. This achieves higher communication performance of the IC card 1E that includes the laminated plurality of (three in this case) metal plates 20 including the intermediate metal plate 20F composed of the film substrate 23 and the metal foils 24.

In the IC card 1E according to the fifth embodiment, in addition to the insulating layers 30 that are made of an adhesive and provided between the metal plates 20 (20A, 20B, 20F), the film substrate 23 described above also serves as an insulating layer. That is, in the intermediate metal plate 20F, the film substrate 23 between the metal foils 24 serves as an insulating layer.

In the present embodiment, the metal foils 24 are made of copper or aluminum, and the metal foils 24 have a thickness larger than the skin depth at the continuous wave frequency during communication. This leads to less loss of current flowing through the metal foils 24 that are provided on the film substrate 23 and serve as some of the metal plates 20, thus achieving higher communication performance of the IC card 1E that includes the laminated plurality of (three in this case) metal plates 20 including the intermediate metal plate 20F composed of the film substrate 23 and the metal foils 24.

Sixth Embodiment

Figure 19:
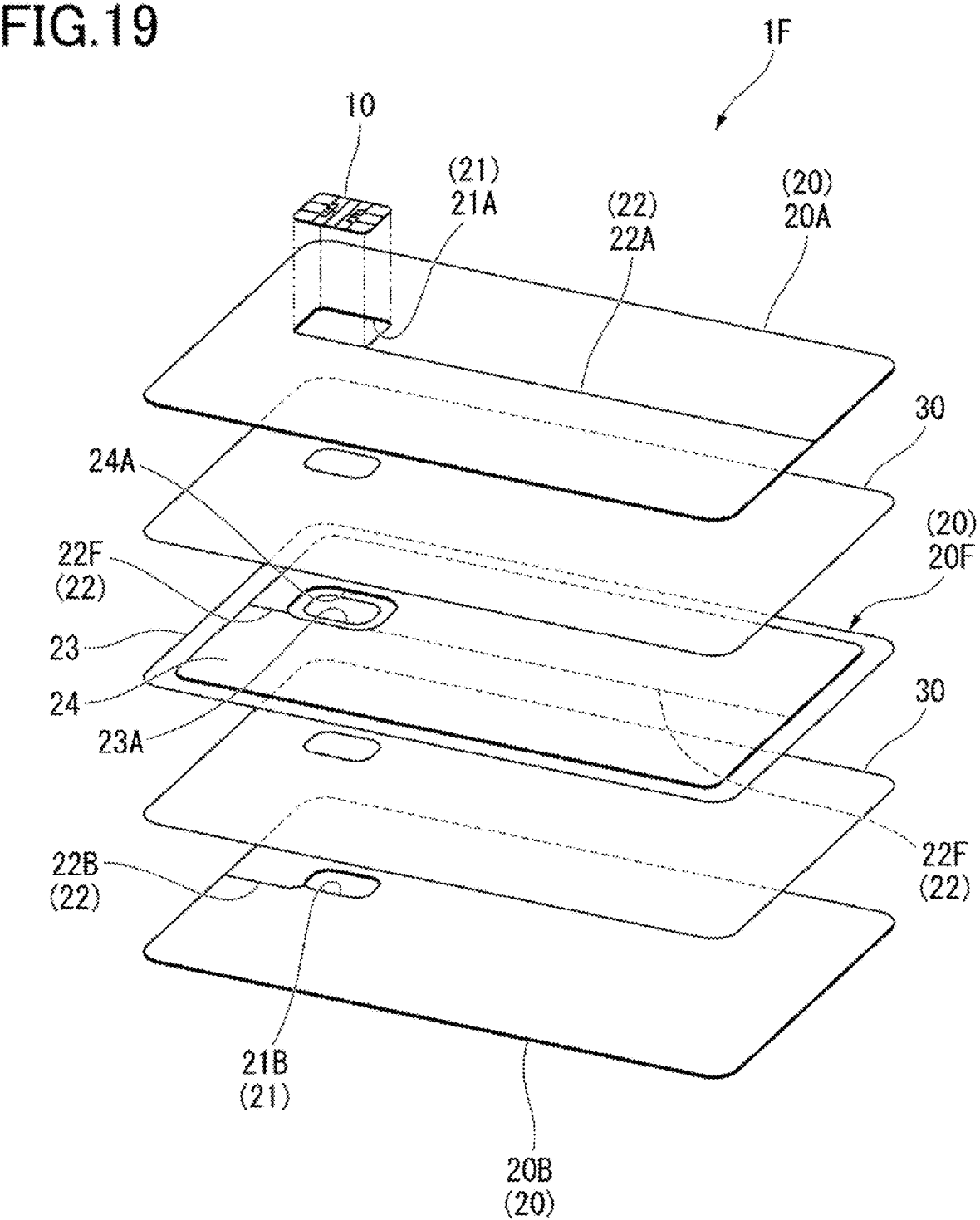
FIG. 19 is a perspective view of an IC card according to a sixth embodiment viewed obliquely from a surface of the IC card.

As shown in FIG. 19, an IC card (contactless communication medium) IF according to a sixth embodiment is partially different from the IC card 1E (see FIG. 17, etc.) of the fifth embodiment described above. Specifically, in the intermediate metal plate 20F of the IC card IF of the sixth embodiment, the through holes 24A of the metal foil patterns of the metal foils 24 are larger in size than the through hole 23A of the film substrate 23, and the metal foils 24 are laminated on the film substrate 23 so that the metal foils 24 are located inside the outer shape of the film substrate 23 in plan view. That is, the metal foils 24 have an outer shape smaller than the outer shape of the film substrate 23.

In the IC card IF according to the sixth embodiment, only a side surface of the film substrate 23 is exposed on a side surface of the IC card IF. This makes it possible to prevent a factor such as deformation of the IC card IF from causing a short circuit between the adjacent metal foils 24 or the adjacent metal plates 20 and leading to a change in communication performance of the laminated metal plates 20.

In the IC card IF according to the sixth embodiment, the film substrate 23 has the through hole 23A that is located in a portion of the film substrate 23 corresponding to the through holes 24A of the metal foil patterns of the metal foils 24 and that has the same shape as the through holes 24A or a smaller size than the through holes 24A.

In this case, it is possible to easily form a card by laminating, using a typical card manufacturing process, the metal plates 20 having the through holes 21 formed in advance and the film in which the metal foils having the through holes 24A are provided on the film substrate 23.

The embodiments of the present invention have been described in detail with reference to the drawings; however, the specific configuration is not limited to the embodiments, and the present invention also includes modifications and combinations of the configurations without departing from the spirit of the present invention.

Seventh Embodiment

As shown in FIGS. 20 to 22B, an IC card (contactless communication medium) 101 according to the present embodiment includes an IC module 110 that includes a planar coil antenna 111 and an IC chip 112, and metal plates 120 that house the IC module 110 and in each of which an outer peripheral portion 120a (metal plate edge portion) serves as an antenna. Each of the metal plates 120 is a coupling frame (CF) that serves as an antenna.

In the following description of the present embodiment, a major surface of the IC card 101 refers to a surface of the IC card 101 on the side on which the IC module 110 is housed, and a back surface of the IC card 101 refers to a surface of the IC card 101 opposite to the major surface.

In the following description of the present embodiment, all metal plates are collectively denoted by reference sign 120, a metal plate that serves as an antenna when necessary is referred to as a first metal plate and denoted by reference sign 120A, and a metal plate that is different from the first metal plate 120A and serves as a parallel flat plate capacitor (described later) is referred to as a second metal plate and denoted by reference sign 120B.

In plan view of the surface of the IC module 110 on the antenna side, each of the metal plates 120 has a through hole 121 in which the IC module 110 fits or with which the IC module 110 overlaps, and a slit 122 that extends from the through hole 121 toward the outer peripheral portion 120a.

The metal plates 120 serve as a coil antenna that is wound with a single turn along the outer peripheral portion 120a to form a loop circuit. The coil antenna of the metal plates 120 is electromagnetically connected to the planar coil antenna 111 of the IC module 110.

At least two or more (two in the present embodiment) metal plates 120 are laminated via an insulating layer 130 that is made of an adhesive. The metal plates 120 include the first metal plate 120A in which a peripheral portion of at least one of a through hole 121 and a slit 122 overlaps with or is close to at least part of the planar coil antenna 111 of the IC module 110 to serve as an antenna, and at least one second metal plate 120B that is laminated adjacent to the first metal plate 120A. That is, in the IC card 101 of the present embodiment, the first metal plate 120A, the insulating layer 130, and the second metal plate 120B are laminated in this order.

In the present embodiment, in at least one position, the first metal plate 120A and the second metal plate 120B are physically connected to each other, or are electrically connected to each other at a low impedance of 30Ω or less at the communication frequency (electrically connected each other in the present embodiment), and the second metal plate 120B extends across the slit 122 of the first metal plate 120A in plan view, and adds electrostatic capacitance between portions of the slit 122 of the first metal plate 120A.

The metal plates 120 have a rectangular shape elongated in a single direction in plan view. The through holes 121 of the metal plates 120 have a substantially rectangular shape, and are located at a position in the center of the metal plates 120 in the lateral direction and closer to one end of the metal plates 120 in the longitudinal direction.

The metal plates 120 are made of, for example, a conductive metal material such as stainless steel or a titanium alloy. The metal plates 120 have a thickness of, for example, 100 μm to 900 μm.

In the following description, side portions of each of the metal plates 120 along the major axis direction are referred to as long side portions 120b and 120c, and side portions of each of the metal plates 120 along the minor axis direction are referred to as short side portions 120d and 120c. Furthermore, of the short side portions, the side portion closer to the IC module 110 is referred to as a first short side portion 120d, and the side portion opposite to the first short side portion 120d in the major axis direction is referred to as a second short side portion 120c.

In the first metal plate 120A, a peripheral portion of a first through hole 121A planarly overlaps with at least part of the planar coil antenna 111 of the IC module 110, thus allowing the first metal plate 120A to be electrically connected to the IC module 110 to serve as an antenna.

The first through hole 121A has a rectangular shape in plan view. Examples of the shape of the first through hole 121A include a circle, a square, an ellipse, and a rectangle. However, the shape of the first through hole 121A is not specifically limited as long as the first through hole 121A has an opening area that allows the first metal plate 120A to be electrically connected to the IC module 110. The first through hole 121A is formed, for example, by laser processing, cutting, or punching. A second through hole 121B (described later) may be different in size from the first through hole 121A; however, the second through hole 121B has the same shape as the first through hole 121A. That is, the IC module 110 fits in the first through hole 121A.

Figure 21:
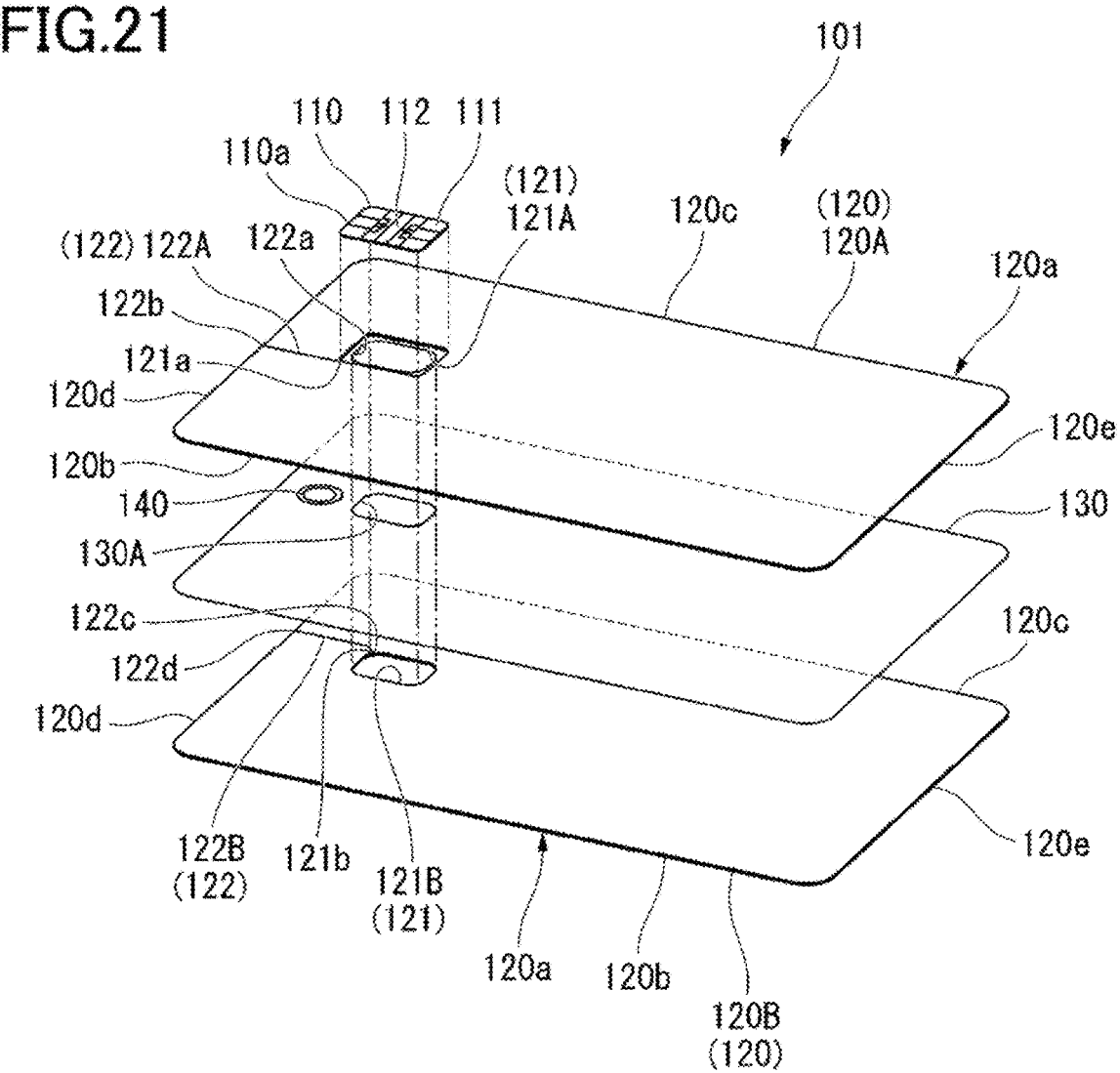
FIG. 21 is an exploded perspective view of the IC card shown in FIG. 20.
Figure 22A:
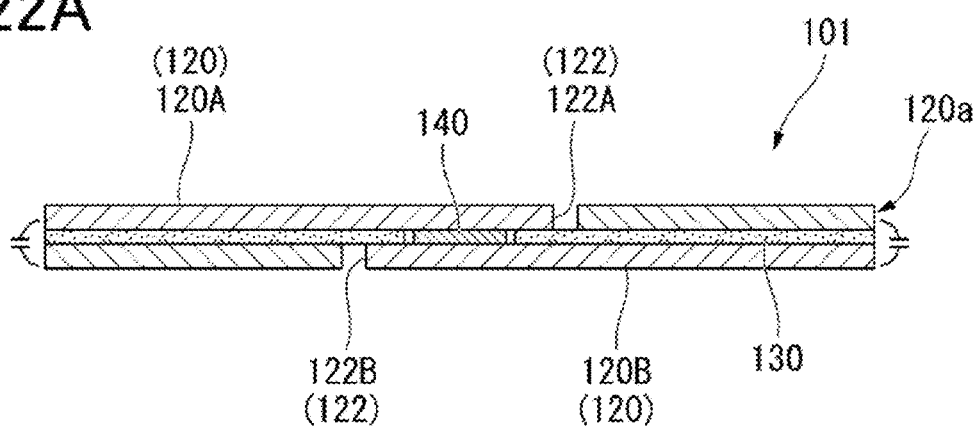
FIG. 22A is a cross-sectional view taken along line E-E in FIG. 20 and shows a cross section passing through a slit portion.
Figure 22B:
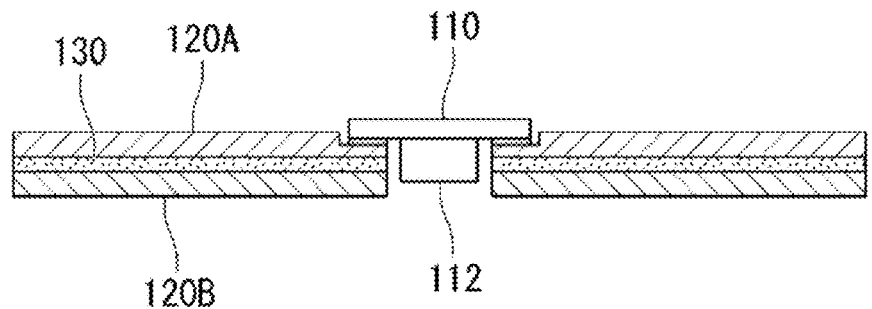
FIG. 22B is a cross-sectional view taken along line F-F in FIG. 20 and shows a cross section passing through a through hole portion.

As shown in FIG. 21, the first through hole 121A of the first metal plate 120A is set to have an outer shape smaller than the outer shape of the IC module 110 so that an outer periphery 110a of the IC module 110 overlaps with the first through hole 121A in plan view. That is, at least part of a metal surface of the first metal plate 120A around the first through hole 121A overlaps in plan view with the planar coil antenna 111 of the IC module 110 via an insulating layer or a void.

The second through hole 121B of the second metal plate 120B overlaps with the first through hole 121A of the first metal plate 120A via the insulating layer 130 in plan view.

In the first metal plate 120A, a first slit 122A extends along the major axis direction from the first through hole 121A to the first short side portion 120d. One end 122a of the first slit 122A on the first through hole 121A side is connected to a corner portion 121a of the first through hole 121A closer to the first short side portion 120d, and the other end 122b of the first slit 122A is connected to the outer peripheral portion 120a while the end 122b is open to the outer peripheral portion 120a. The first slit 122A extends from the corner portion 121a of the first through hole 121A in a direction different from the direction in which a second slit 122B (described later) of another one (the second metal plate 120B) of the metal plates extends from the second through hole 121B.

The first slit 122A is set to have a width of, for example, 50 μm to 0.5 mm.

In the second metal plate 120B, the second slit 122B extends along the major axis direction from the through hole 121 to the first short side portion 120d. One end 122c of the second slit 122B on the second through hole 121B side is connected to a corner portion 121b of the second through hole 121B closer to the first short side portion 120d, and the other end 122d of the second slit 122B is connected to the outer peripheral portion 120a while the end 122d is open to the outer peripheral portion 120a. The second slit 122B extends from the second through hole 121B in a direction different from the direction in which the first slit 122A of the first metal plate 120A extends from the corner portion 121a of the first through hole 121A.

The second slit 122B is set to have a width of, for example, 50 µm to 0.5 mm.

The slit 22A of the first metal plate 20A and the slit 22B of the second metal plate 20B are provided so that the slits 22A and 22B do not mostly overlap with each other in plan view.

Figure 20:
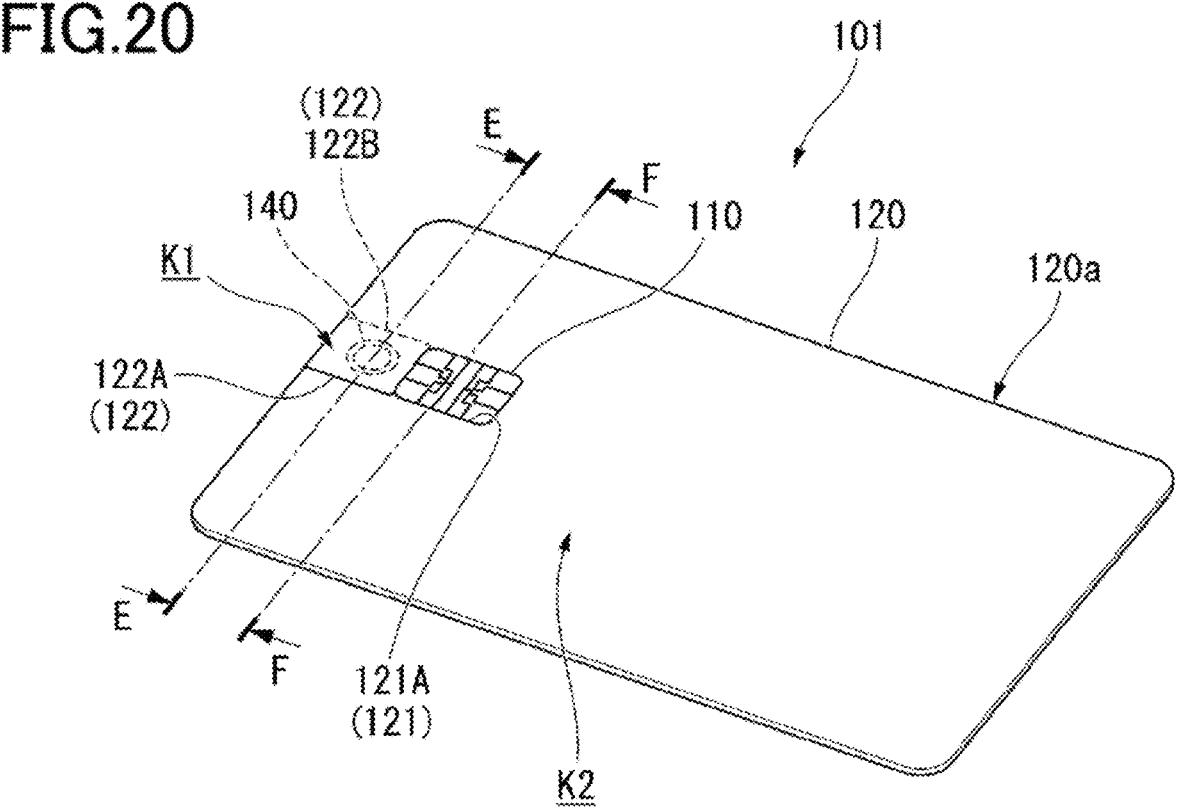
FIG. 20 is a perspective view of an IC card according to a seventh embodiment of the present invention viewed obliquely from a surface of the IC card.

As shown in FIG. 20, the first metal plate 120A and the second metal plate 120B have a first region K1 that is defined by the first slit 122A, the second slit 122B, and the through holes 121A and 121B, and a second region K2 that is not defined by these slits and through holes. In one of the first region K1 and the second region K2, the first metal plate 120A and the second metal plate 120B are physically connected to each other, or are electrically connected to each other at a low impedance of 30Ω or less at the communication frequency. The first metal plate 120A and the second metal plate 120B are physically or electrically connected to each other in the first region K1 or the second region K2, whichever has a smaller area in plan view. In the present embodiment, the area of the first region K1 is smaller than the area of the second region K2, and thus the first region K1 serves as a connection portion.

In the present embodiment, the area ratio between the first region K1 and the second region K2 is preferably larger than at least 1:4. In other words, the area ratio of the first region K1 to the second region K2 is preferably smaller than at least 0.25 (¼).

The insulating layer 130 constituting an insulator is preferably set to have a thickness of 100 um or less, and is interposed between the first metal plate 120A and the second metal plate 120B. The insulating layer 130 has a relative permittivity of 1.5 or more.

The insulating layer 130 can be formed by laminating an insulation sheet having an adhesion function with the first metal plate 120A and the second metal plate 120B, followed by pressing.

Alternatively, the insulating layer 130 can be formed by applying a resin having an adhesion function to the surfaces of the first metal plate 120A and the second metal plate 120B, followed by pressing. Furthermore, the insulating layer 130 may be formed by applying the resin to the first metal plate 120A and the second metal plate 120B by screen printing.

Part of the insulating layer 130 is composed of a conductive member (conductive member 140). The conductive member 140 is a conductive resin, an anisotropic conductive resin, a metal flake, solder, a resin ball having a surface on which a metal layer is provided, or a spring having a surface on which a metal layer is provided.

In the conductive member 140, the first metal plate 120A and the second metal plate 120B are electrically connected to each other at a low impedance of 30Ω or less at the communication frequency. The first metal plate 120A and the second metal plate 120B are electrically or physically connected to each other via the conductive member 140 formed by a connection method such as application of a conductive material, welding, plating, pressure welding, screwing, or soldering.

Figure 23:
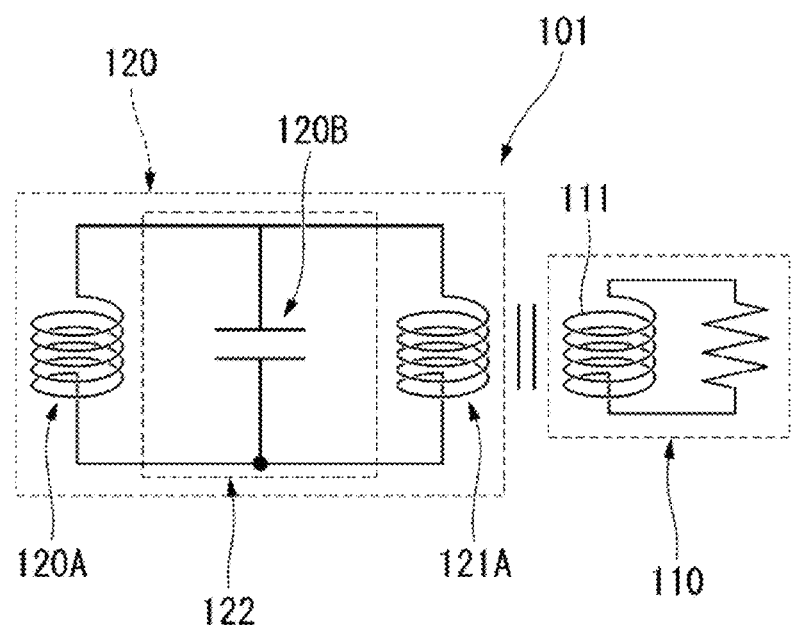
FIG. 23 is an equivalent circuit diagram of the IC card of the seventh embodiment.

FIG. 23 is an equivalent circuit diagram illustrating a principle of the IC card 101 of the seventh embodiment.

A high-frequency signal (not shown) generated in a transmission/reception circuit of a reader/writer (contactless external device) (not shown) induces a high-frequency magnetic field in the planar coil antenna 111 of the IC module 110. The high-frequency magnetic field is emitted as magnetic energy to a space.

In this case, when the IC card 101 is located in the high-frequency magnetic field, the high-frequency magnetic field causes a current to flow through a parallel resonant circuit composed of the antenna of the first metal plate 120A. A signal received by the resonant circuit is transmitted to the IC chip 112 by electromagnetic coupling between the antenna coil and the planar coil antenna 111 of the IC module 110.

The absolute value of the imaginary part of an impedance at the communication frequency of the IC chip 112 of the IC module 110 or the continuous wave frequency (13.56 MHz) is set to be larger than the absolute value of the imaginary part of an impedance measured for a module alone of the planar coil antenna 111 of the IC module 110.

Furthermore, the absolute value of the imaginary part of an impedance at the communication frequency of the IC chip 112 of the IC module 110 or the continuous wave frequency is larger than the absolute value of the imaginary part of an impedance while the planar coil antenna 111 of the IC module 110 is attached to the peripheral portion of the first through hole 121A of the first metal plate 120A, and the second metal plate 120B is not present.

As shown in FIG. 20, in the IC card 101 of the present embodiment, the metal plates 120 (120A, 120B) are set to have the same shape as the IC card 101. That is, the outer shape of the metal plates 120 (120A, 120B) is a card shape.

Figure 24:
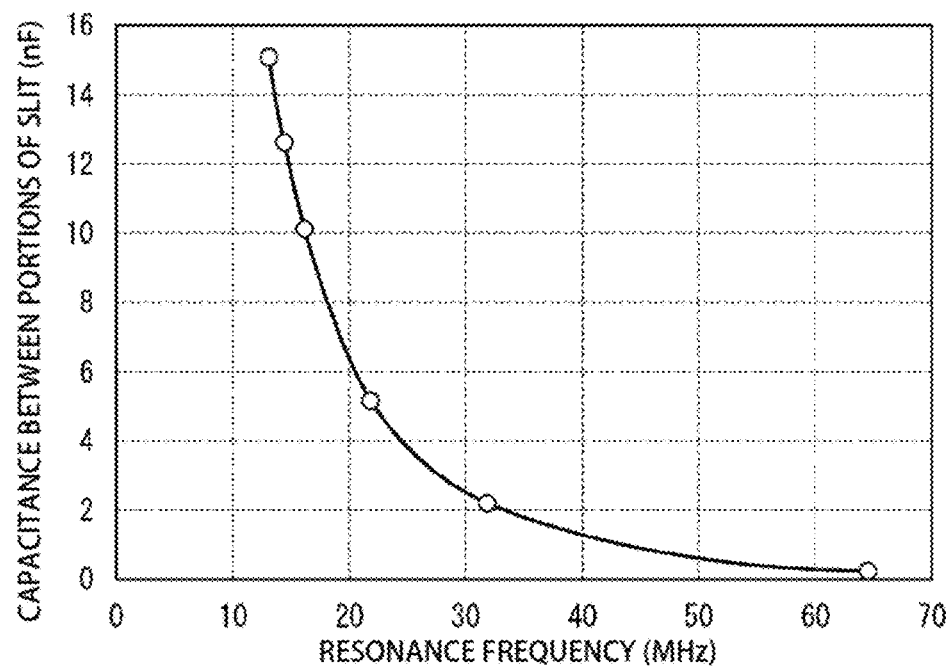
FIG. 24 is a diagram showing the relationship between the resonance frequency and the capacitance between portions of a slit.

FIG. 24 shows the relationship between the resonance frequency (MHz) and the capacitance (nF) between portions of the slit. The effective electrostatic capacitance formed by the second metal plate 120B that extends across the first slit 122A of the first metal plate 120A is 1 nF or more and 20 nF or less.

Figure 25:
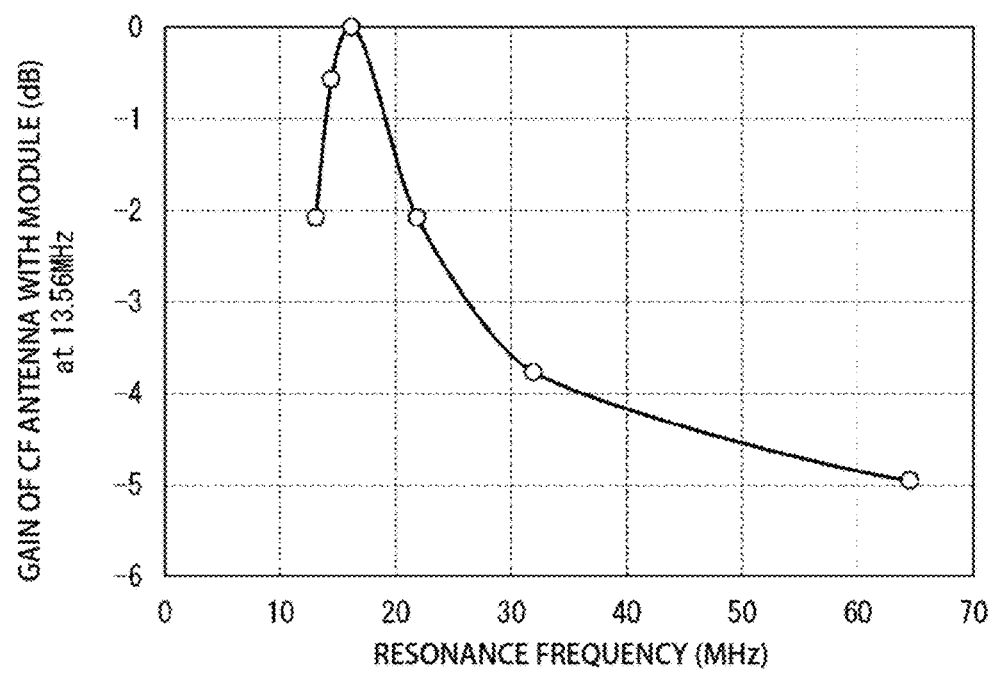
FIG. 25 is a diagram showing the relationship between the resonance frequency and the gain of an antenna provided with a module.
Figure 26:
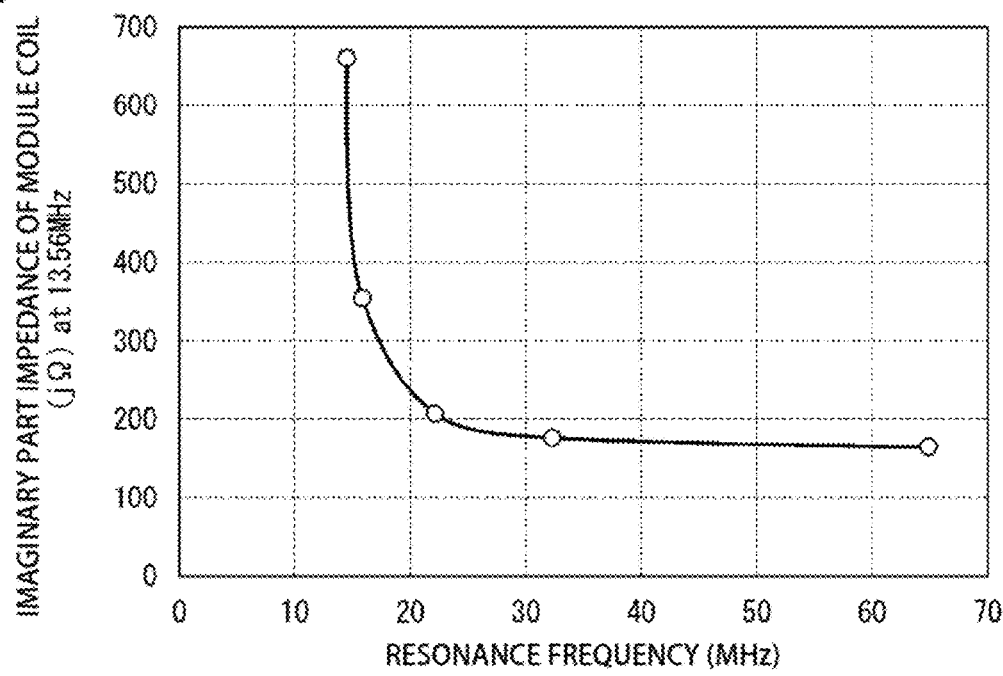
FIG. 26 is a diagram showing the relationship between the resonance frequency and the imaginary part of an impedance of a module coil.

FIG. 25 shows the relationship between the resonance frequency (MHz) and the relative gain (dB) of the metal plate 120 (the first metal plate 120A) including the IC module 110. FIG. 26 shows the correlation between the resonance frequency (MHz) of the first metal plate 120A and the imaginary part of an impedance of the module coil (after attachment to the first metal plate 120A).

In the IC card 101, the resonance frequency of the metal plates 120A and 120B laminated while the IC module 110 is removed is set to be more than 13.56 MHz and 25 MHz or less. As shown in FIG. 26, as the resonance frequency approaches 13.56 MHz from a range higher than 13.56 MHz, the imaginary part of an impedance of the module coil (after attachment to the first metal plate 120A) is increased.

When the IC module 110 is attached to the metal plates 120, the complex impedance (communication frequency or CW frequency (13.56 MHz)) of both ends (IC connection portions) of the planar coil antenna 111 of the IC module 110 can be set to be the complex conjugate of the complex impedance of the input terminal of the IC chip. This allows the IC card 101 to achieve higher communication performance.

Next, effects of the IC card 101 described above will be described in detail with reference to the drawings.

In the present embodiment, in at least one position, the first metal plate 120A serving as an antenna and at least one second metal plate 120B laminated adjacent to the first metal plate 120A are physically connected to each other, or are electrically connected to each other at a low impedance of 30Ω or less at the communication frequency, and the second metal plate 120B extends across the slit 122 of the first metal plate 120A in plan view, and adds electrostatic capacitance between portions of the slit 122. This makes it possible to add electrostatic capacitance between portions of the slit 122 of the first metal plate 120A serving as an antenna by a simple method that does not require processing such as connecting a capacitor element between portions of the slit 122 of the first metal plate 120A and does not hinder the card manufacturing process. Thus, addition of electrostatic capacitance between portions of the slit 122 can reduce the self-resonant frequency of the metal plate 120, making it possible to adjust the self-resonant frequency to improve the communication performance at a desired communication frequency.

In the present embodiment, the slit 122 of at least one of the laminated plurality of metal plates 120 extends from the through hole 121 in a direction different from the direction in which the slit 122 of another one of the metal plates 120 extends from the through hole 121, and the two metal plates 120 adjacent to each other in the lamination direction are provided so that the slits 122 of the respective two metal plates 120 do not overlap with each other in plan view. In one of the first region K1 that is defined by the slits 122 and the through holes 121 of the respective two metal plates 120 in plan view and the second region K2 that is not defined by the slits and the through holes of the metal plates 120, the first metal plate 120A and the second metal plate 120B are physically connected to each other, or are electrically connected to each other at a low impedance of 30Ω or less at the communication frequency.

This makes it possible to prevent the electrostatic capacitance formed between portions of the slit 122 of the metal plate 120 from being excessively small. Furthermore, lamination of the plurality of metal plates 120 having the slits 122 located at different positions and extending in different directions allows the IC card 101 to have a higher mechanical strength against stress caused by twisting or bending.

In the present embodiment, in the first region K1 or the second region K2, whichever has a smaller area in plan view, the first metal plate 120A and the second metal plate 120B are physically connected to each other, or are electrically connected to each other at a low impedance of 30Ω or less at the communication frequency.

This can maximize the electrostatic capacitance formed between portions of the slit 122 of the metal plate 120. Furthermore, lamination of the plurality of metal plates 120 having the slits 122 located at different positions and extending in different directions allows the IC card 101 to have a higher mechanical strength against stress caused by twisting or bending.

In the present embodiment, the area ratio between the first region K1 and the second region K2 is larger than at least 1:4. In other words, the area ratio of the first region K1 to the second region K2 is smaller than at least 0.25 (¼).

This can maximize the electrostatic capacitance formed between portions of the slit 122 of the metal plate 120. Furthermore, lamination of the plurality of metal plates 120 having the slits 122 located at different positions and extending in different directions allows the IC card 101 to have a higher mechanical strength against stress caused by twisting or bending.

In the present embodiment, the IC module 110 is provided in the through hole 121 of one of the laminated plurality of metal plates 120, and at least part of the peripheral portion of the through hole 121 overlaps with the planar coil antenna 111 of the IC module 110 in plan view, and at least part of the planar coil antenna 111 of the IC module 110 overlaps with the through hole 121 of the other metal plate 120 in plan view.

Thus, the metal plates 120 are electrically connected to the IC module 110, allowing the IC card 101 to achieve higher communication performance. Furthermore, by matching the height of the surface of one of the metal plates 120 laminated on the other metal plate 120 to the height of the contact terminal surface of the IC module 110, it is possible to apply metal-like decoration to the surface of the IC card 101.

In the present embodiment, the insulating layer 130 interposed between the first metal plate 120A and the second metal plate 120B has a thickness of 100 um or less, and the insulating layer 130 preferably has a relative permittivity of 1.5 or more. This enables the amount of electrostatic capacitance formed between portions of the slit 122 of the metal plate 120 to be set so that the self-resonant frequency of the laminated metal plates 120 is significantly changed.

In the present embodiment, the insulating layer 130 is formed by laminating an insulation sheet having an adhesion function with the metal plates, followed by pressing. This makes it possible to easily form a card by laminating the metal plates 120 using a typical card manufacturing process.

In the present embodiment, the insulating layer 130 is formed by applying a resin having an adhesion function to the metal plates 120, followed by pressing. This makes it possible to easily form a card by laminating the metal plates 120 using a typical card manufacturing process.

In the present embodiment, the insulating layer 130 is formed by applying the resin to the metal plates 120 by screen printing. This makes it possible to easily form a card by laminating the metal plates 120 using a typical card manufacturing process. Furthermore, the insulating layer 130 can have a thickness of approximately several micrometers. This enables a smaller number of laminated metal plates 120 to form larger electrostatic capacitance between portions of the slit 122.

In the present embodiment, only part of the insulating layer 130 between the laminated metal plates 120 is composed of the conductive member 140. Therefore, by electrically connecting parts of the laminated metal plates 120 at a low impedance at the communication frequency, it is possible to form larger electrostatic capacitance between portions of the slit 122 of the metal plate 120 serving as an antenna, as compared with the case where the laminated metal plates 120 are not electrically connected; thus, the self-resonant frequency of the laminated metal plates 120 is more likely to be significantly changed.

In the present embodiment, the conductive member 140 is a conductive resin, an anisotropic conductive resin, a metal flake, solder, a resin ball having a surface on which a metal layer is provided, or a spring having a surface on which a metal layer is provided. Therefore, by electrically connecting parts of the laminated metal plates 120 at a low impedance at the communication frequency, it is possible to form larger electrostatic capacitance between portions of the slit 122 of the metal plate 120 serving as an antenna, as compared with the case where the laminated metal plates 120 are not electrically connected; thus, the self-resonant frequency of the laminated metal plates 120 is more likely to be significantly changed.

In the present embodiment, the metal plates 120 have the same outer shape as the IC card 101, and the effective electrostatic capacitance formed between portions of the slit 122 of the first metal plate 120 (120A) by the second metal plate 120 (120B) is 1 nF or more and 20 nF or less. Thus, due to the electrostatic capacitance formed between portions of the slit 122 of the metal plate 120, the self-resonant frequency of the laminated metal plates 120 can be significantly changed.

In the present embodiment, the IC card 101 may be configured such that the first metal plate 120 has a through hole instead of the conductive member 140 described above and that the first metal plate 120A and the second metal plate 120B are electrically or physically connected to each other in the through hole by a connection method such as application of a conductive material, welding, plating, pressure welding, screwing, or soldering. This can expand the application range of the method of electrically connecting parts of the laminated metal plates 120 at a low impedance at the communication frequency. Furthermore, the connection portion (through hole) is covered by the module as viewed from the surface of the IC card 101, thus causing no damage to the appearance of the IC card 101.

In the present embodiment, the metal plates 120 have the same outer shape as the IC card 101, and the resonance frequency of the metal plates 120 laminated while the IC module 110 is removed is more than 13.56 MHz and 25 MHz or less. Thus, due to the self-resonant frequency of the laminated metal plates 120, the complex impedance (communication frequency or CW frequency (13.56 MHz)) of both ends of the planar coil antenna 111 of the IC module 110 (connection portions of the IC module 110) can be significantly changed.

Eighth Embodiment

Figure 27:
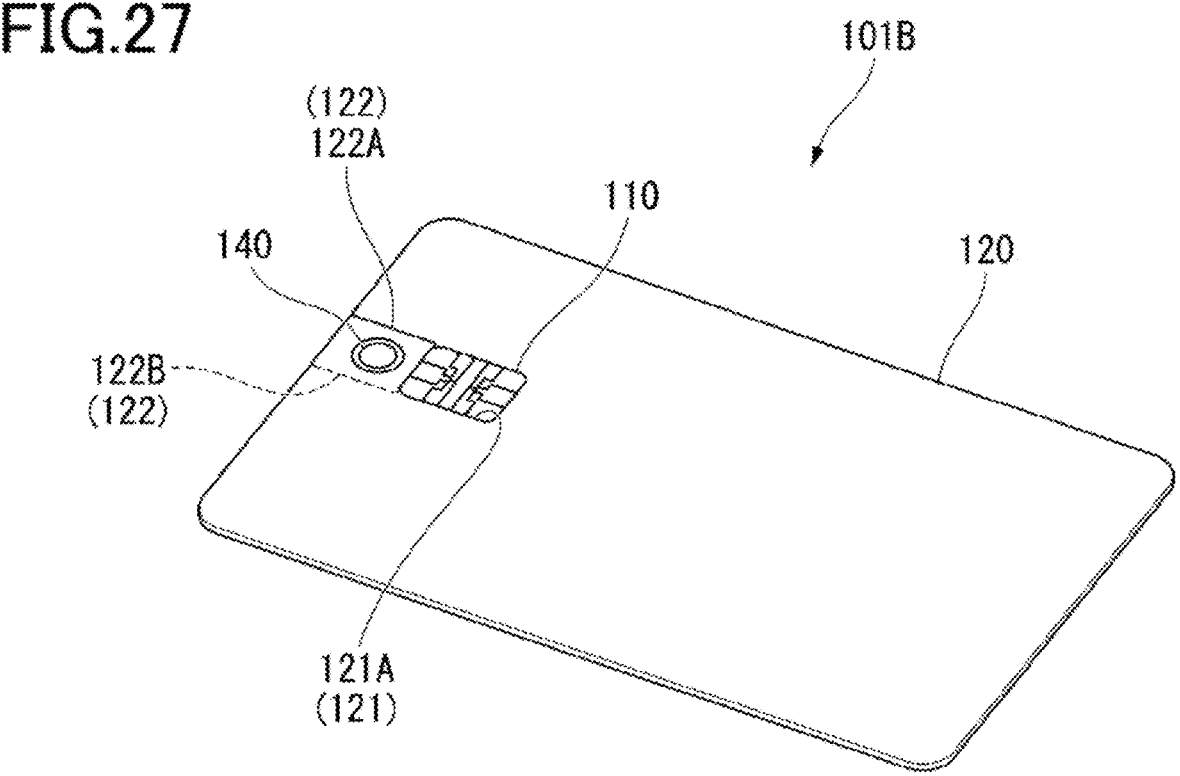
FIG. 27 is a perspective view of an IC card according to an eighth embodiment viewed obliquely from a surface of the IC card.
Figure 28:
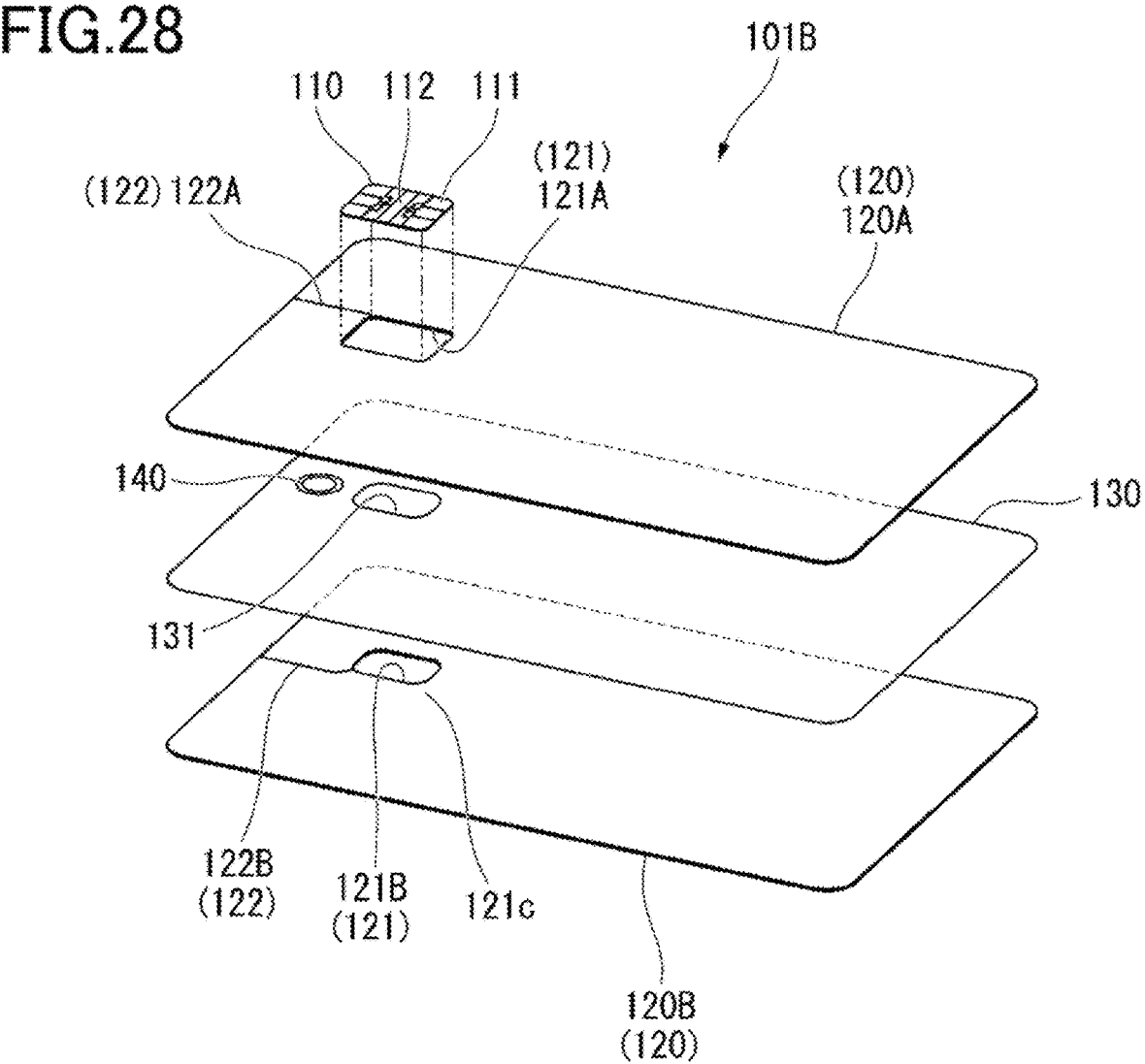
FIG. 28 is an exploded perspective view of the IC card shown in FIG. 27.

In an IC card 101B according to an eighth embodiment shown in FIGS. 27 and 28, the IC module 110 is provided in the through hole 121 of the metal plate 120A, which is one of the laminated metal plates 120A and 120B. At least part of a peripheral portion 121c of the through hole 121 of the metal plate 120B overlaps with the planar coil antenna 111 of the IC module 110 via the insulating layer 130. At least part of the peripheral portion 121c of the through hole 121 of the metal plate 120B may not necessarily overlap with the planar coil antenna 111 of the IC module 110 via the insulating layer 130 as an insulator, and may overlap with the planar coil antenna 111 of the IC module 110 via a void.

As in the seventh embodiment described above, the conductive member 140 is provided in part of the insulating layer 130 between the laminated metal plates 120A and 120B.

The through hole 121A of the metal plate 120A is set to have the same dimension as the IC module 110 or a larger dimension than the IC module 110 to allow the IC module 110 to fit in the through hole 121A in plan view.

As in the seventh embodiment described above, the through hole 121B of the metal plate 120B is set to be smaller than the outer shape of the IC module 110.

In the eighth embodiment, the metal plates 120 are electrically connected to the IC module 110, allowing the IC card 101B to achieve higher communication performance.

Furthermore, in the eighth embodiment, by matching the height of the surface of the first metal plate 120A laminated on the second metal plate 120B to the height of the contact terminal surface of the IC module 110, it is possible to apply metal-like decoration to the surface of the IC card 101B.

Ninth Embodiment

Figure 29:
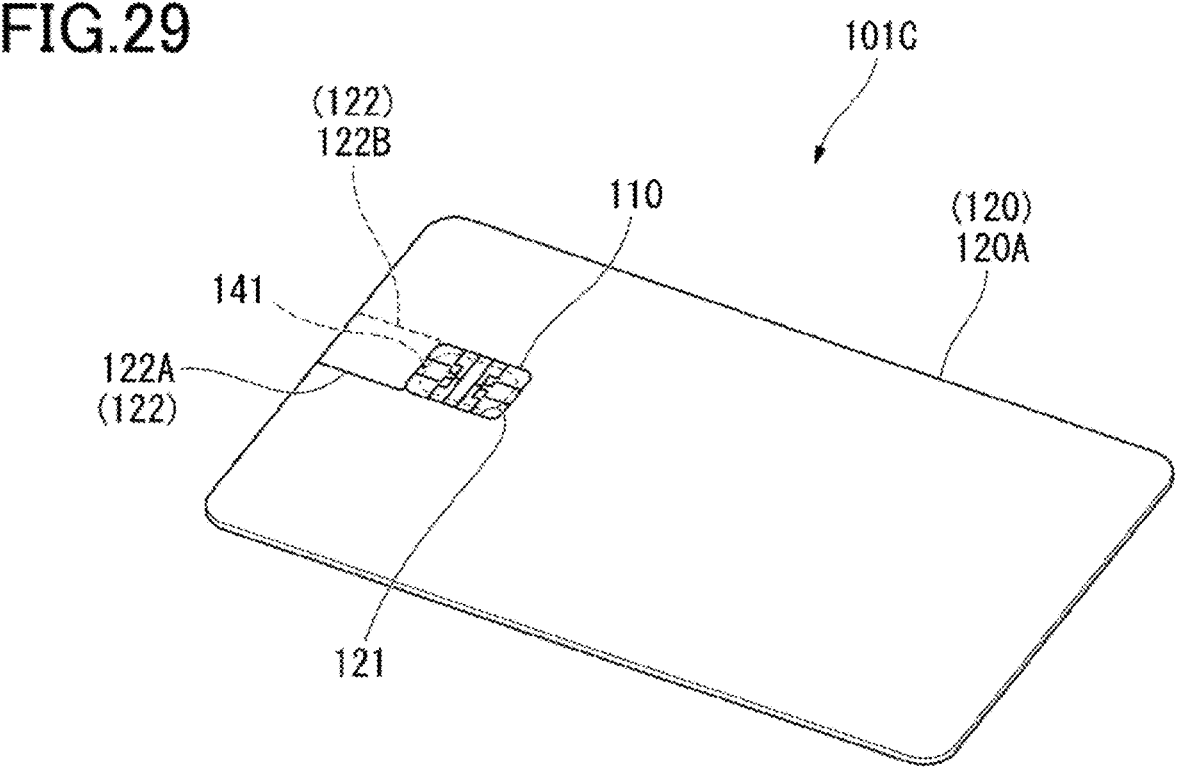
FIG. 29 is a perspective view of an IC card according to a ninth embodiment viewed obliquely from a surface of the IC card.
Figure 30:
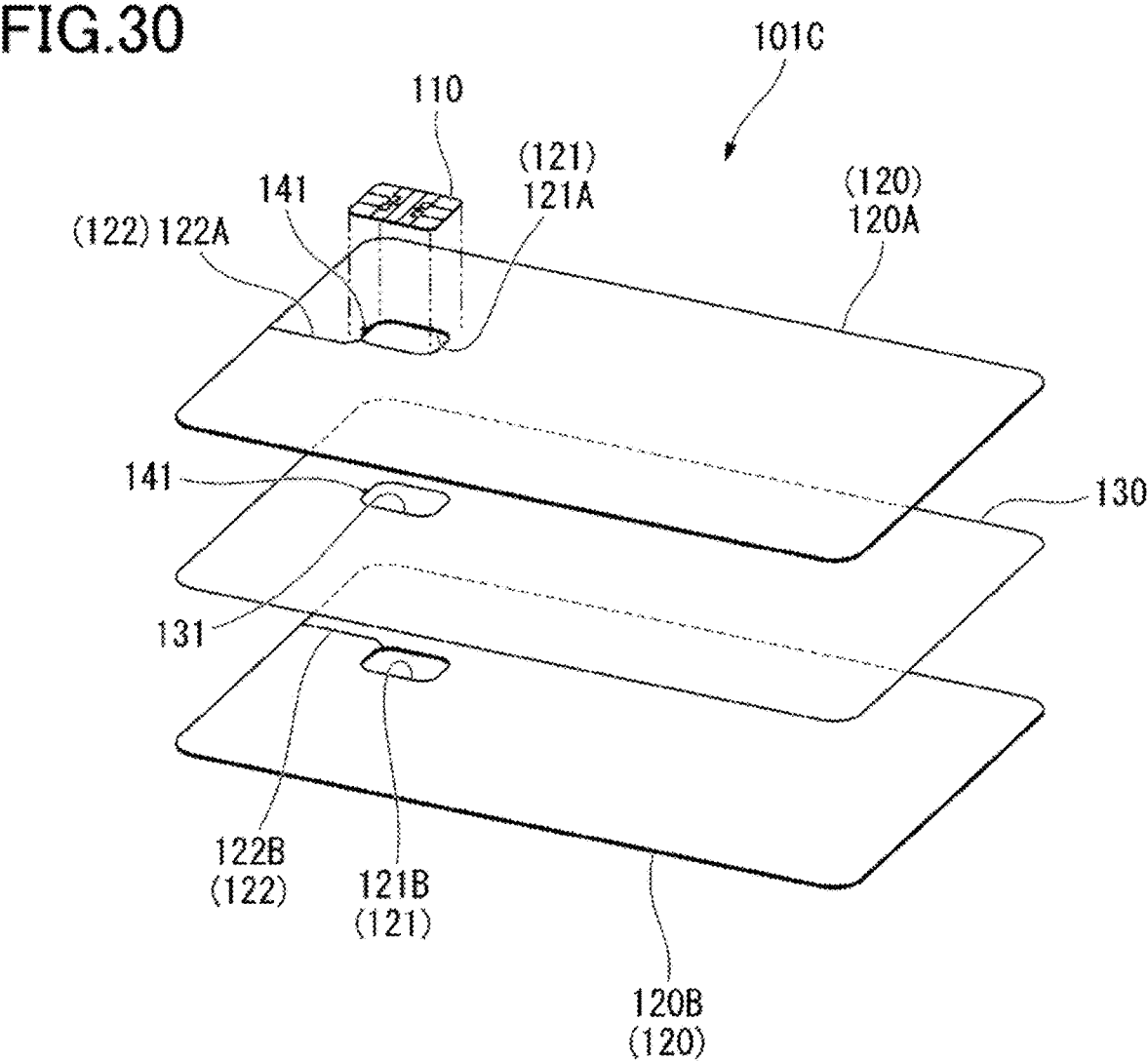
FIG. 30 is an exploded perspective view of the IC card shown in FIG. 29.
Figure 31:
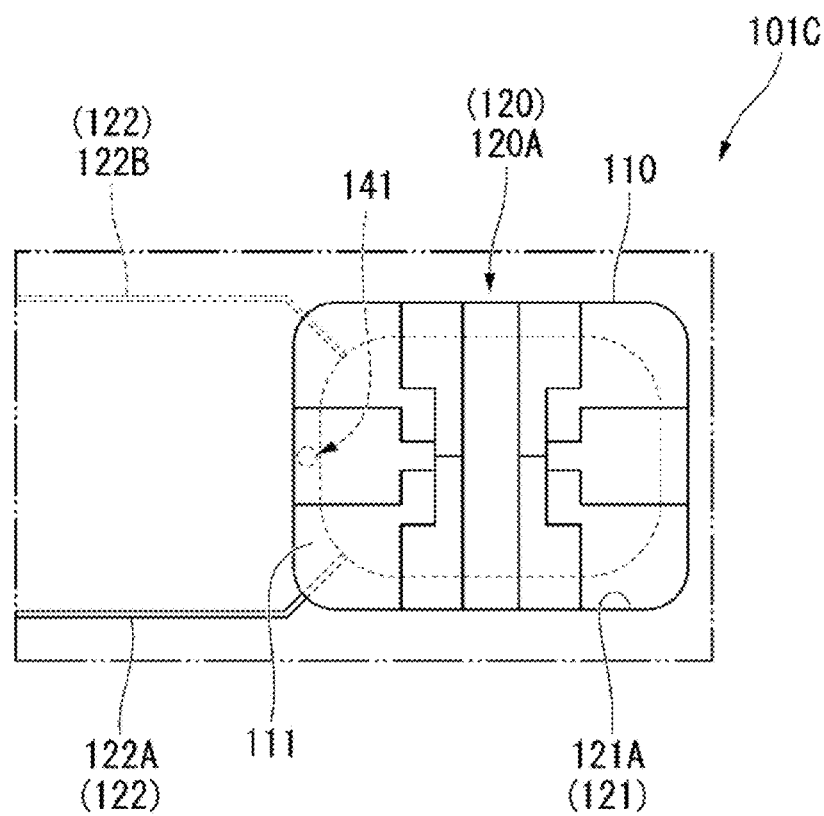
FIG. 31 is an enlarged view of an IC module.
Figure 32:
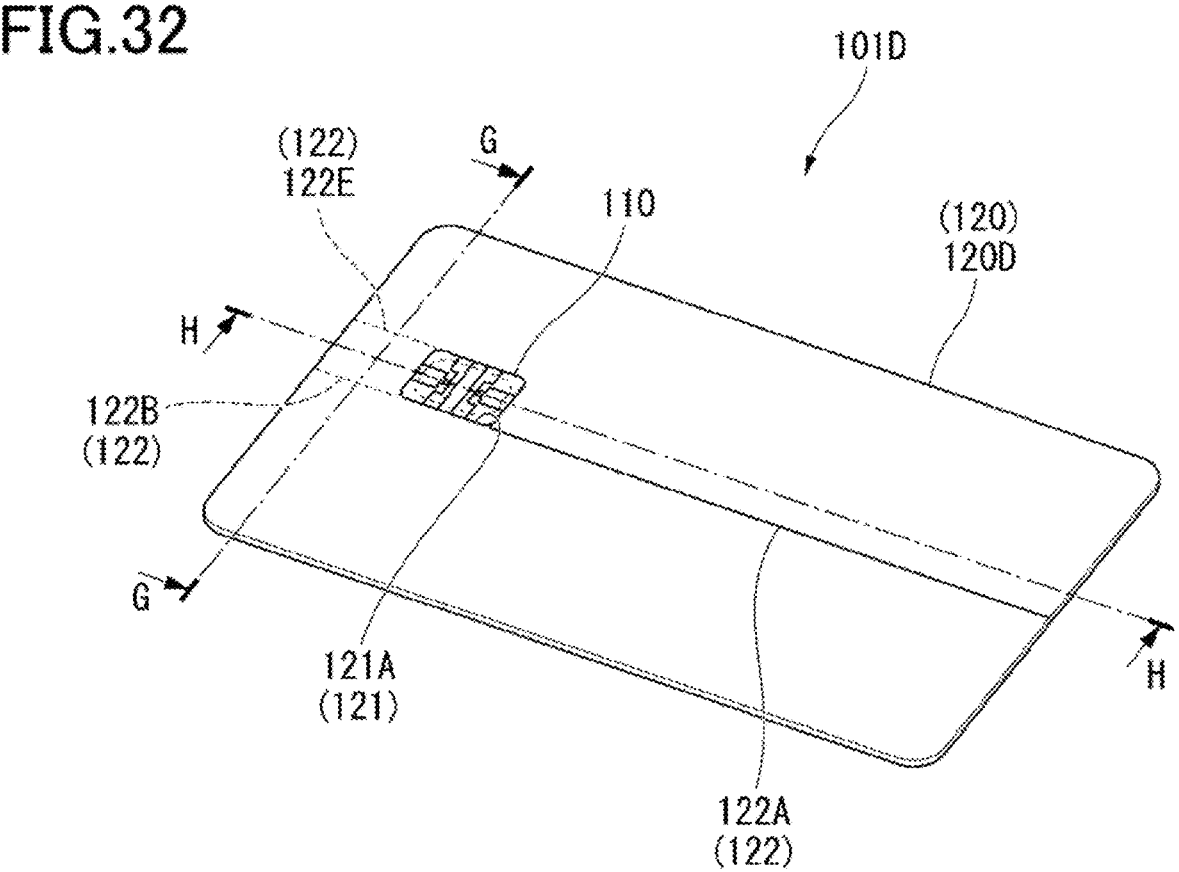
FIG. 32 is a perspective view of an IC card according to a tenth embodiment viewed obliquely from a surface of the IC card.
Figure 33:
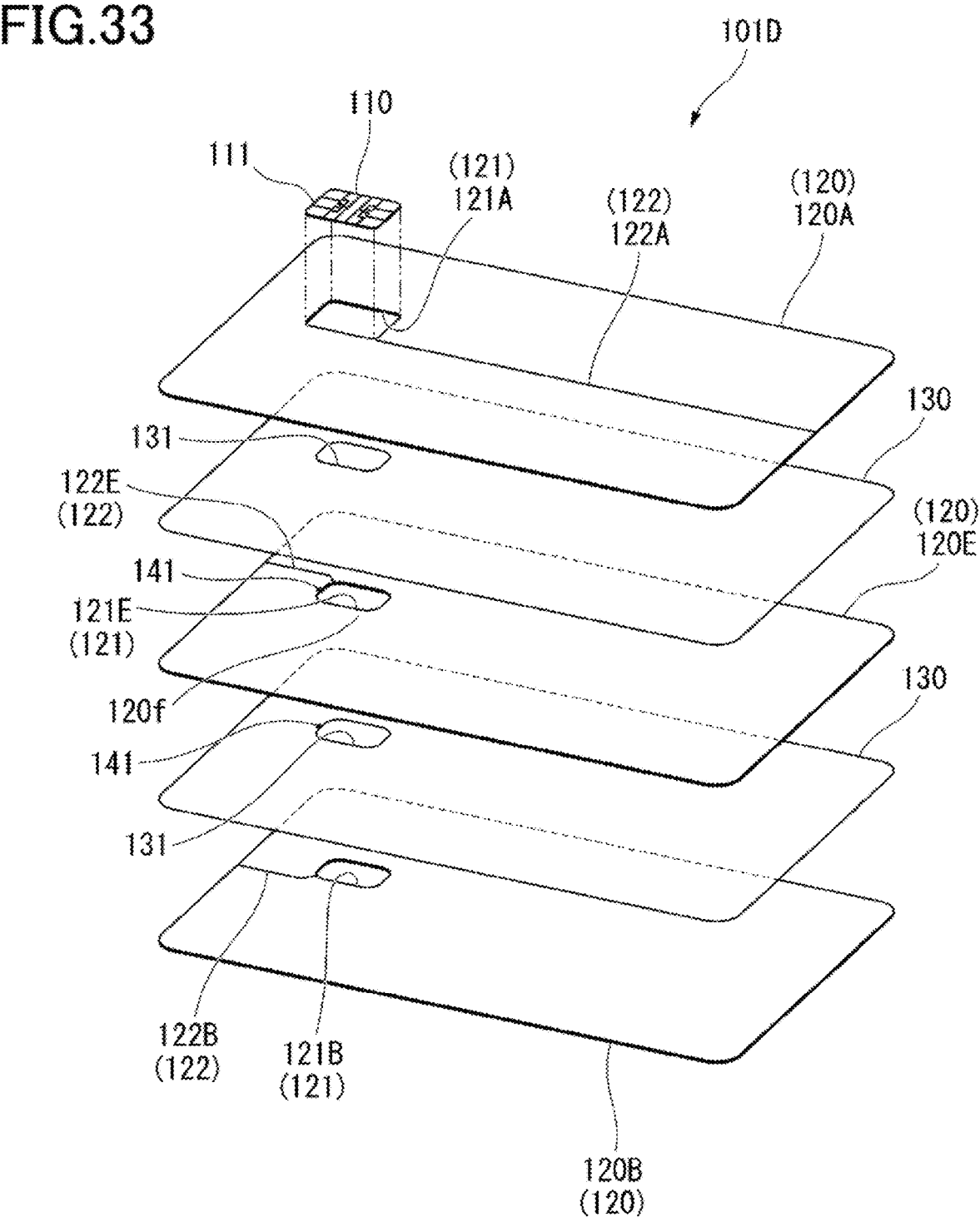
FIG. 33 is an exploded perspective view of the IC card shown in FIG. 32.
Figure 34:
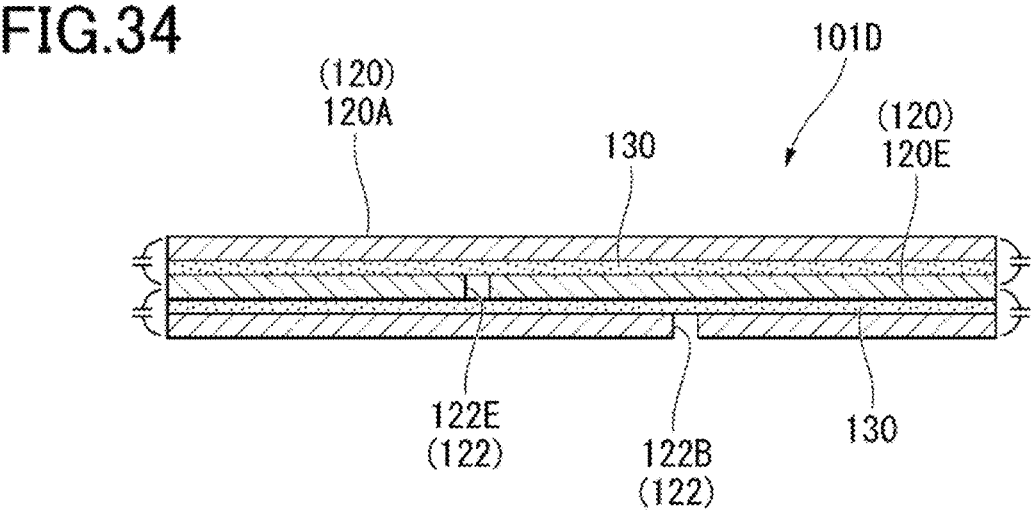
FIG. 34 is a cross-sectional view taken along line G-G in FIG. 32.
Figure 35:
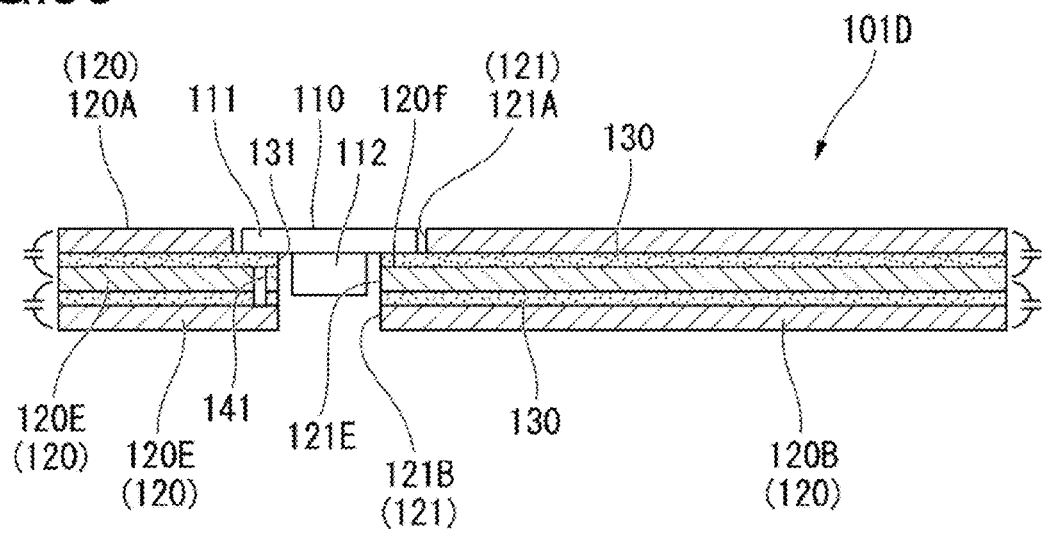
FIG. 35 is a cross-sectional view taken along line H-H in FIG. 32.

In an IC card 101C according to a ninth embodiment shown in FIGS. 29 to 31, the first metal plate 120A and the second metal plate 120B are electrically connected to each other at a low impedance of 30Ω or less at the communication frequency in a conductive through hole 141 that is provided in a region in which the first metal plate 120A and the planar coil antenna 111 of the IC module 110 overlap with each other. The conductive through hole 141 passes through not only the first metal plate 120A but also the insulating layer 130.

The conductive through hole 141 of the ninth embodiment has a smaller diameter than the conductive member 140 of the seventh and eighth embodiments described above. The first metal plate 120A and the second metal plate 120B are electrically connected to each other through the conductive through hole 141.

In the IC card 101C according to the ninth embodiment, it is possible to expand the application range of the method of electrically connecting parts of the laminated metal plates 120 at a low impedance at the communication frequency.

In this case, the conductive through hole 141 as a connection portion is covered by the IC module 110 in plan view of the surface of the IC card 101C. This makes it possible to prevent damage to the appearance of the IC card 101C.

Tenth Embodiment

In an IC card 101D according to a tenth embodiment shown in FIGS. 32 to 36, three plates 120 (120A, 120B, 120E) are laminated via insulating layers 130.

When an intermediate metal plate 120E of the three metal plates 120 is viewed as an antenna, of the three metal plates 120, the metal plates 120A and 120B above and below the intermediate metal plate 120E serve to form a flat plate capacitance between portions of a slit 122E of the intermediate metal plate 120E. At least one of the metal plates 120A and 120B above and below the intermediate metal plate 120E is physically connected to part of the intermediate metal plate 120E or is electrically connected to part of the intermediate metal plate 120E at a low impedance of 30Ω or less at the communication frequency to form a flat plate capacitance between portions of the slit 122E of the intermediate metal plate 120E (see FIG. 34).

The intermediate metal plate 120E overlaps with the planar coil antenna 111 in at least part of a peripheral portion 120f (see FIG. 35) of a through hole 121E via an insulator or a void (corresponding to an insulating layer 130 in the present embodiment). The metal plate 120A serves, between portions of the slit 122E of the intermediate metal plate 120E, as a flat plate series capacitance as two flat plate capacitors connected in series.

The metal plate 120B is physically connected to part of the intermediate metal plate 120E or is electrically connected to part of the intermediate metal plate 120E at a low impedance of 30Ω or less at the communication frequency to serve to form a flat plate capacitance between portions of the slit 122E of the intermediate metal plate 120E.

Figure 36:
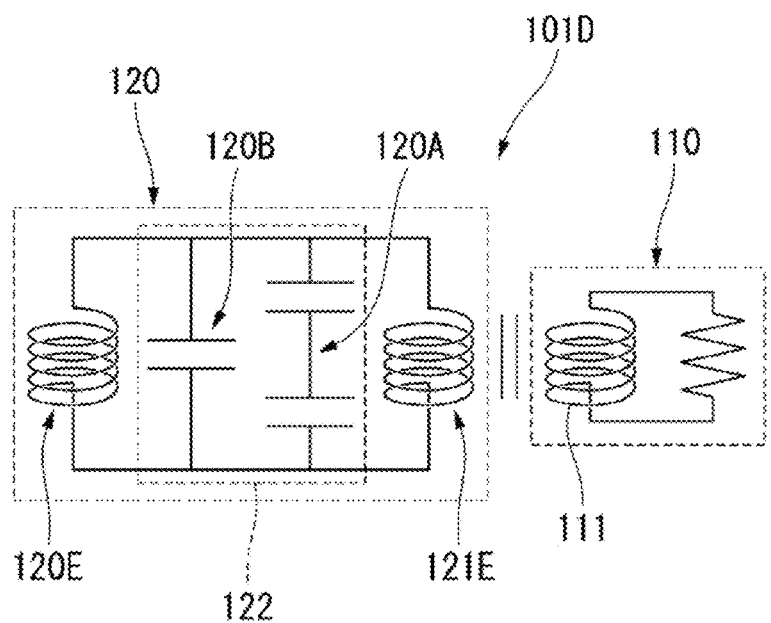
FIG. 36 is an equivalent circuit diagram of the IC card of the tenth embodiment.

In the IC card 101D according to the tenth embodiment, as shown in FIG. 36, electrostatic capacitance between portions of the slit 122E of the intermediate metal plate 120E can be formed on the front and back of the metal plate 120E, enabling formation of a larger electrostatic capacitance.

Furthermore, lamination of the metal plates 120A and 120B above and below the intermediate metal plate 120E allows each of the metal plates 120A and 120B to serve as an antenna, and also allows the metal plates 120A and 120B adjacent to the intermediate metal plate 120E to serve as flat plate capacitance forming electrodes. Thus, the self-resonant frequency of the laminated metal plates 120 can be adjusted to a lower value.

Eleventh Embodiment

Figure 37:
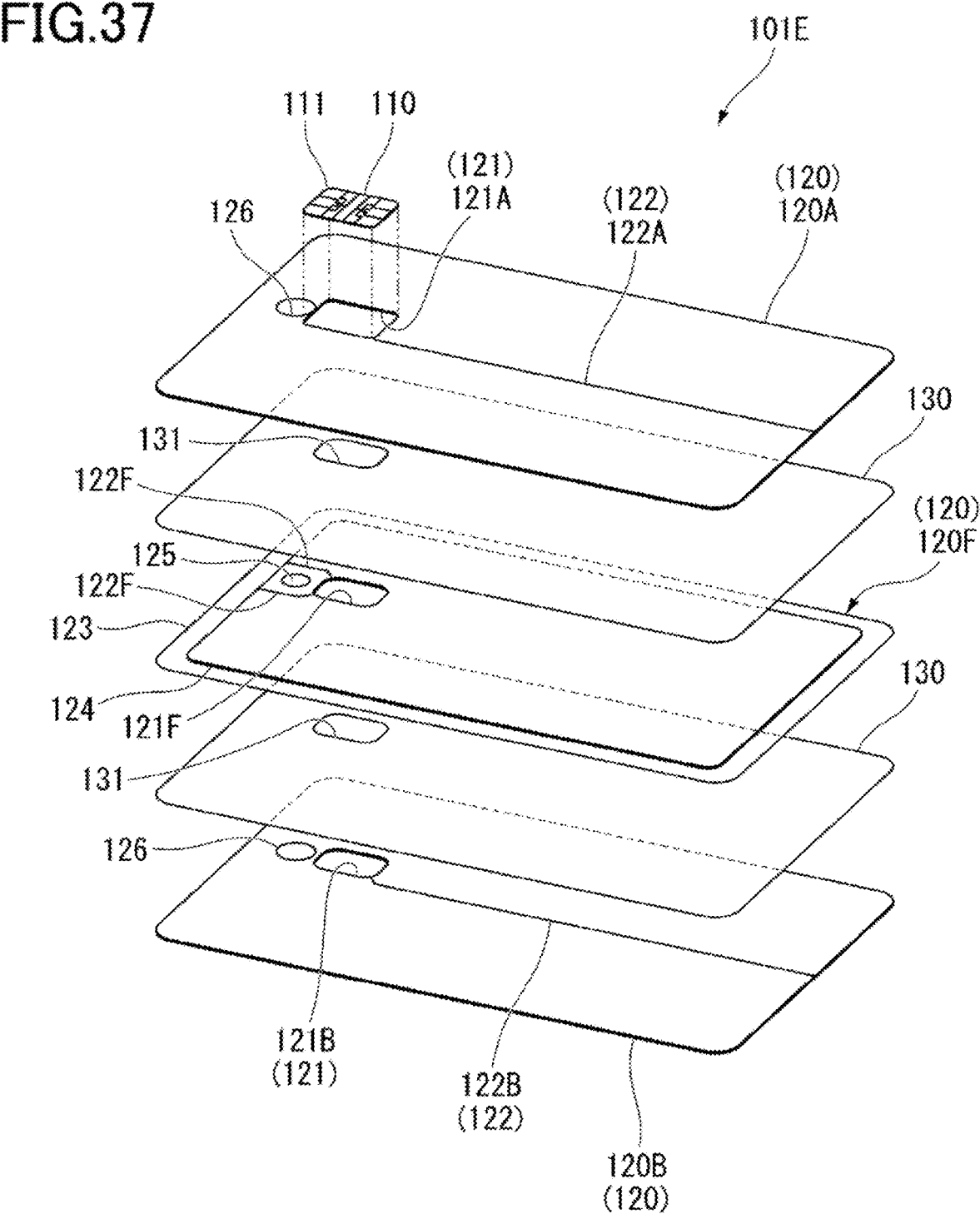
FIG. 37 is an exploded perspective view of an IC card according to an eleventh embodiment.
Figure 38:
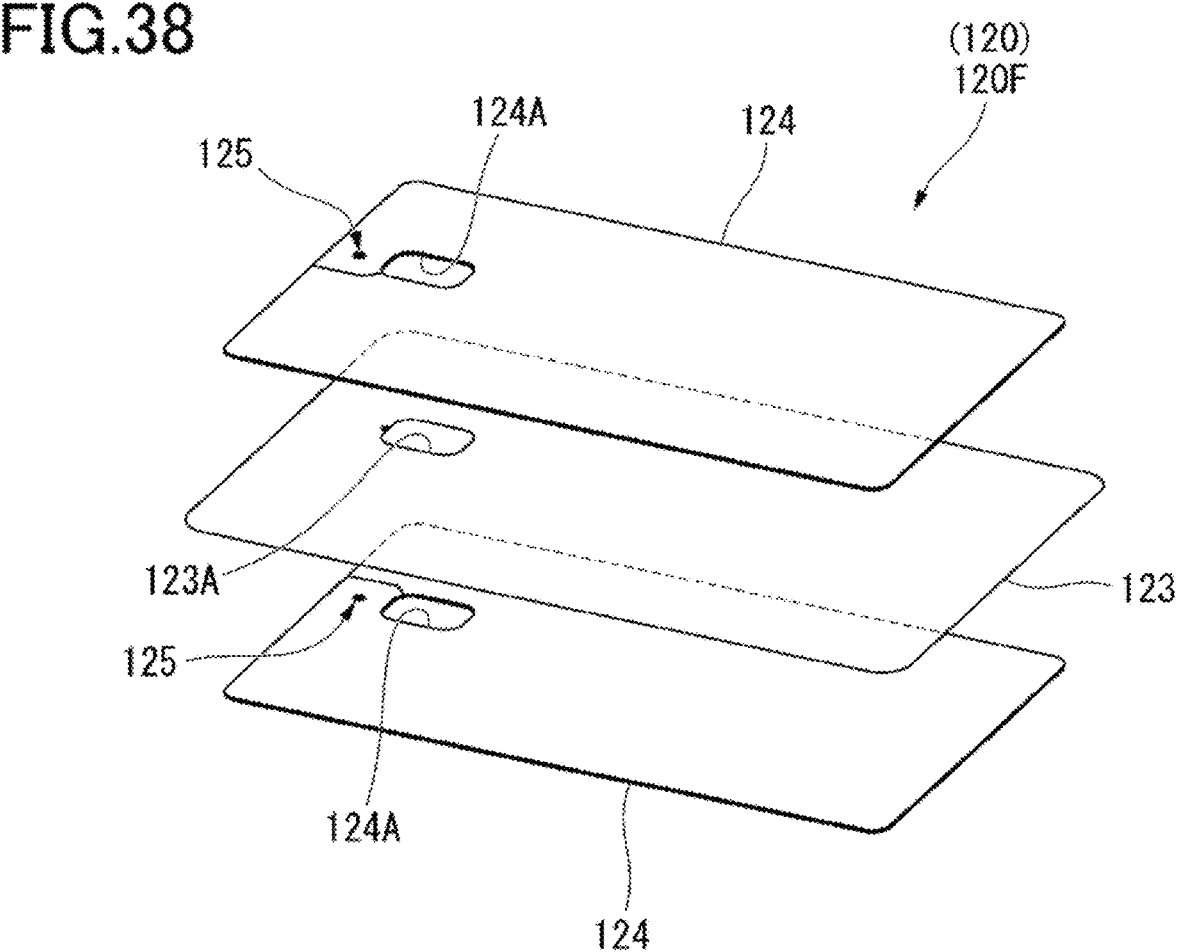
FIG. 38 is an exploded perspective view of an intermediate metal plate in FIG. 37.

In an IC card 101E according to an eleventh embodiment shown in FIGS. 37 and 38, the laminated plurality of (three in this case) metal plates 120 include a metal plate 120 in which a metal foil 124 that is made of copper or aluminum is provided on one or both of surfaces 123a and 123b of a film substrate 123 that is made of a resin (an intermediate metal plate 120F may be separately provided on both surfaces of the film substrate 123). That is, in the metal plate 120F in which at least one metal foil 124 is provided on the film substrate 123, the film substrate 123 and the at least one metal foil 124 are laminated together via an insulating layer 130. Thus, when metal foils 124 are provided on both surfaces of the film substrate 123, the IC card 101E substantially includes four metal layers (see FIG. 37).

This makes it possible to easily increase the number of laminated metal plates 120. Furthermore, it is possible to easily form a card by laminating the metal plates 120 using a typical card manufacturing process.

The material for forming the film substrate 123 is, for example, a thermoplastic resin having insulating properties. The material for forming the film substrate 123 may be a transparent resin or an opaque resin that has insulating properties and thermoplastic properties. Examples of the material for forming the film substrate 23 include polyester resins such as PEN (polyethylene naphthalate) and PET (polyethylene terephthalate), polycarbonate, polyethylene, polypropylene, and polystyrene.

The metal foils 124 provided on the surfaces 123a and 123b on the front and back of the film substrate 123 may be electrically connected to each other by a method such as pressure bonding, pressure welding, or welding.

Metal foil patterns of the two metal foils 124 provided on the surfaces 123a and 123b on the front and back of the film substrate 123 are set to have an outer dimension smaller than the outer dimension of the film substrate 123, and the two metal foils 124 are laminated so that the metal foil patterns are located inside the outer shape of the film substrate 123 in plan view. Here, the phrase "inside the outer shape of the film substrate 123" means the side on which the film substrate 123 is present. Thus, only a side surface of the film substrate 123 is exposed on a side surface of the IC card 101E. This makes it possible to prevent a factor such as deformation of the IC card 101E from causing a short circuit between the adjacent metal foils 124 or the adjacent metal plates 120A and 120B and leading to a change in communication performance of the laminated metal plates 120.

The metal foils 124 are set to have a thickness larger than the skin depth at the continuous wave frequency during communication. This leads to less loss of current flowing through the metal foils 124 that are provided on the film substrate 123 and serve as some of the metal plates 120, thus achieving higher communication performance of the IC card 101E that includes the laminated metal plates 120 including the film substrate 123.

Through holes 124A of the metal foil patterns of the metal foils 124 are set to be larger in size than a through hole 123A of the film substrate 123. That is, while the metal foils 124 are laminated on the film substrate 123, the outer shape of the through hole 123A of the film substrate 123 is located inside the through holes 124A of the metal foils 124 in plan view.

In this case as well, only the side surface of the film substrate 123 is exposed on the side surface (through hole side) of the IC card 101E. This makes it possible to prevent a factor such as deformation of the IC card 101E from causing a short circuit between the adjacent metal foils 124 or the adjacent metal plates 120A and 120B and leading to a change in communication performance of the laminated metal plates 120.

As shown in FIGS. 37 and 38, at least part of the planar coil antenna 111 of the IC module 110 housed in the through hole 121A of the metal plate 120A is provided directly above a through hole 121F of the intermediate metal plate 120F via an insulating layer 130.

In this case, the IC module 110 is directly coupled to the metal foils 124 on the film substrate 123; thus as compared with other metal plates that are often made of SUS metal, a larger amount of current flows through the metal foils 124 on the film substrate 123 that are made of a material such as aluminum or copper and have high electrical conductivity. This achieves higher communication performance of the IC card 101E that includes the laminated plurality of (three in this case) metal plates 120 including the intermediate metal plate 120F composed of the film substrate 123 and the metal foils 124.

In the IC card 101E according to the eleventh embodiment, in addition to the insulating layers 130 that are made of an adhesive and provided between the metal plates 120 (120A, 120B, 120F), the film substrate 123 described above also serves as an insulating layer. That is, in the intermediate metal plate 120F, the film substrate 123 between the metal foils 124 serves as an insulating layer.

As shown in FIG. 37, a crimped portion 125 is provided between slits 122F of the intermediate metal plate 120F. The crimped portion 125 is crimped, for example, to protrude toward the upper side or lower side of the surface of the IC card 101E, that is, toward the metal plate 120A or 120B. When the metal plate 120A and the metal plate 120B are laminated above and below the intermediate metal plate 120F, each of the metal plate 120A and the metal plate 120B that overlap with the crimped portion 125 of the intermediate metal plate 120F has a recessed portion 126 for avoiding the crimped portion 125. In this case, the recessed portions 126 form physical uneven portions that electrically connect the metal patterns on the front and back of the metal plates 120A and 120B laminated above and below the metal plate 120F including the film substrate 123. When the plurality of metal plates 120 are laminated to form the IC card 101E, the recessed portions 126 can prevent the crimped portion 125 from being brought into contact with another metal plate 120 and causing a change in electrical performance of the antenna. The metal plates 120A and 120B may have through holes instead of the recessed portions 126.

The embodiments of the present invention have been described in detail with reference to the drawings; however, the specific configuration is not limited to the embodiments, and the present invention also includes modifications and combinations of the configurations without departing from the spirit of the present invention.

INDUSTRIAL APPLICABILITY

A contactless communication medium of the present invention achieves larger electrostatic capacitance with a simple structure.

[Reference Signs List] 1, 1B to 1F IC card (contactless communication medium); 10 IC module; 11 Planar coil antenna; 12 IC chip; 20 Metal plate; 20a Outer peripheral portion (metal plate edge portion); 20A First metal plate; 20B Second metal plate; 20C Intermediate metal plate; 21 Through hole; 22 Slit; 23 Film substrate; 24 Metal foil; 25 Through hole; 30 Insulating layer; 101, 101B to 101E IC card (contactless communication medium); 110 IC module; 111 Planar coil antenna; 112 IC chip; 120 Metal plate; 120A First metal plate; 120B Second metal plate; 121 Through hole; 122 Slit; 125 Crimped portion; 126 Recessed portion; 130 Insulating layer; 140 Conductive member; 141 Conductive through hole.

What is claimed is:

1. A contactless communication medium, comprising:
   an IC module that includes a planar coil antenna and an IC chip; and
   a plurality of metal plates in each of which a metal plate edge portion serves as an antenna, wherein
   in plan view of a plate surface of the plurality of metal plates, each of the metal plates has
      a through hole in which the IC module fits or with which the IC module overlaps, and
      a slit that extends from the through hole toward the metal plate edge portion,
   the plurality of metal plates are laminated via an insulating layer,
   the plurality of metal plates include
      a first metal plate in which a peripheral portion of at least one of the through hole and the slit overlaps with or is close to at least part of the planar coil antenna of the IC module to serve as an antenna, and
      a second metal plate that is laminated adjacent to the first metal plate, and
   the second metal plate extends across the slit of the first metal plate in plan view of the first metal plate, and adds, between portions of the slit of the first metal plate, electrostatic capacitance as two flat plate capacitors connected in series.

2. The contactless communication medium of claim 1, wherein
   the slit of one of the plurality of metal plates extends from the through hole in a direction different from a direction in which the slit of another one of the plurality of metal plates extends from the through hole,
   the one of the plurality of metal plates and the another one of the plurality of metal plates are provided so that, in plan view, the slit of the one of the plurality of metal plates and the slit of the another one of the plurality of metal plates do not overlap with each other and are located on a same line, and
   a straight line formed by the slit of the one of the plurality of metal plates and the slit of the another one of the plurality of metal plates is located at a position at which an area of each of the one of the plurality of metal plates and the another one of the plurality of metal plates is divided into two.

3. The contactless communication medium of claim 1, wherein
   the slit of one of the plurality of metal plates extends from the through hole in a direction different from a direction in which the slit of another one of the plurality of metal plates extends from the through hole,
   the one of the plurality of metal plates and the another one of the plurality of metal plates are provided so that, in plan view, the slit of the one of the plurality of metal plates and the slit of the another one of the plurality of metal plates do not overlap with each other and are located on a same line, and
   a straight line formed by the slit of the one of the plurality of metal plates and the slit of the another one of the plurality of metal plates is located at a position at which an area of each of the one of the plurality of metal plates and the another one of the plurality of metal plates is divided into two so that an area ratio of one of the two to another one of the two is larger than 0.25.

4. The contactless communication medium of claim 1, wherein at least part of a metal surface of at least one of the plurality of metal plates around the through hole overlaps in plan view with the planar coil antenna of the IC module via an insulator or a void.

5. The contactless communication medium of claim 4, wherein
   the at least one of the plurality of metal plates comprises two metal plates, and
   the IC module fits in the through hole of one of the two metal plates, and the IC module overlaps with a peripheral portion of the through hole of another one of the two metal plates.

6. The contactless communication medium of claim 1, wherein
   the plurality of metal plates comprise three metal plates, and
   when an intermediate metal plate of the three metal plates is viewed as an antenna, the metal plates above and below the intermediate metal plate add, between portions of the slit of the intermediate metal plate, a flat plate series capacitance as two flat plate capacitors connected in series.

7. The contactless communication medium of claim 1, wherein
   the insulating layer is interposed between the plurality of metal plates, and
   the insulating layer has a thickness of 100 um or less.

8. The contactless communication medium of claim 7, wherein the insulating layer has a relative permittivity of 1.5 or more.

9. The contactless communication medium of claim 7, wherein the insulating layer is formed by laminating an insulation sheet having an adhesion function with the plurality of metal plates, followed by pressing.

10. The contactless communication medium of claim 7, wherein the insulating layer is formed by applying a resin having an adhesion function to the plurality of metal plates, followed by pressing.

11. The contactless communication medium of claim 10, wherein the resin is applied to the plurality of metal plates by screen printing.

12. The contactless communication medium of claim 1, wherein
   the plurality of metal plates have a same shape as an IC card that is the contactless communication medium, and
   an effective electrostatic capacitance formed by the second metal plate that serves as the flat plate capacitors and extends across the slit of the first metal plate is 1 nF or more and 20 nF or less.

13. The contactless communication medium of claim 1, wherein
   the plurality of metal plates have a same shape as an IC card that is the contactless communication medium, and
   a resonance frequency of the first metal plate and the second metal plate laminated while the IC module is removed is more than 13.56 MHz and 25 MHz or less.

14. The contactless communication medium of claim 1, wherein an absolute value of an imaginary part of an impedance at a communication frequency of the IC chip of the IC module or at a continuous wave frequency (13.56 MHz) is larger than an absolute value of an imaginary part of the impedance measured for a module alone of the planar coil antenna of the IC module.

15. The contactless communication medium of claim 1, wherein an absolute value of an imaginary part of the impedance at a communication frequency of the IC chip of the IC module or at a continuous wave frequency is larger than an absolute value of an imaginary part of the impedance while the planar coil antenna of the IC module is attached to the peripheral portion of the through hole of the first metal plate, and the second metal plate that forms flat plate capacitance is not present.

16. The contactless communication medium of claim 1, wherein the plurality of metal plates include a metal plate in which at least one metal foil is provided on one or both surfaces of a film substrate made of a resin.

17. The contactless communication medium of claim 16, wherein another metal layer is laminated, via the insulating layer, on the film substrate provided with the at least one metal foil.

18. The contactless communication medium of claim 16, wherein a metal foil pattern of the at least one metal foil has an outer dimension smaller than an outer dimension of the film substrate, and the at least one metal foil is laminated so that the metal foil pattern is located inside the film substrate, in plan view.

19. The contactless communication medium of claim 16, wherein, in plan view, a metal foil pattern of the at least one metal foil has a through hole larger in size than a through hole of the film substrate and the at least one metal foil is laminated so that the through hole of the film substrate is located inside the through hole of the metal foil pattern.

20. The contactless communication medium of claim 16, wherein the film substrate has a through hole that is located in a portion of the film substrate corresponding to a through hole of a metal foil pattern of the at least one metal foil and that has a same shape as the through hole of the metal foil pattern or a smaller size than the through hole of the metal foil pattern.

21. The contactless communication medium of claim 16, wherein
the at least one metal foil is made of copper or aluminum, and
the at least one metal foil has a thickness larger than a skin depth at a continuous wave frequency during communication.

22. The contactless communication medium of claim 16, wherein at least part of the planar coil antenna of the IC module is provided, via the insulating layer, directly above the through hole of the metal plate in which the at least one metal foil is provided on the film substrate.

23. The contactless communication medium of claim 16, wherein the insulating layer includes the film substrate.

24. A contactless communication medium, comprising:
an IC module that includes a planar coil antenna and an IC chip; and
a plurality of metal plates in each of which a metal plate edge portion serves as an antenna, wherein
in plan view of a plate surface of the plurality of metal plates, each of the metal plates has
a through hole in which the IC module fits or with which the IC module overlaps, and
a slit that extends from the through hole toward the metal plate edge portion,
the plurality of metal plates are laminated via an insulating layer,
the plurality of metal plates include
a first metal plate in which a peripheral portion of at least one of the through hole and the slit overlaps with or is close to at least part of the planar coil antenna of the IC module to serve as an antenna, and
a second metal plate that is laminated adjacent to the first metal plate,
in at least one position, the first metal plate and the second metal plate are physically connected to each other, or are electrically connected to each other at a low impedance of 30Ω or less at a communication frequency, and
the second metal plate extends across the slit of the first metal plate in plan view of the first metal plate, and adds electrostatic capacitance between portions of the slit of the first metal plate.

25. The contactless communication medium of claim 24, wherein
the slit of one of the plurality of metal plates extends from the through hole in a direction different from a direction in which the slit of another one of the plurality of metal plates extends from the through hole,
the one of the plurality of metal plates and the another one of the plurality of metal plates are provided so that the slit of the one of the plurality of metal plates and the slit of the another one of the plurality of metal plates substantially do not overlap" with each other in plan view,
the one of the plurality of metal plates and the another one of the plurality of metal plates have
a first region that is defined by the slits and the through holes of the one of the plurality of metal plates and the another one of the plurality of metal plates, and
a second region that is not defined by the slits and the through holes, and
in one of the first region and the second region, the first metal plate and the second metal plate are physically connected to each other, or are electrically connected to each other at a low impedance of 30Ω or less at a communication frequency.

26. The contactless communication medium of claim 25, wherein the first metal plate and the second metal plate are physically or electrically connected to each other in the first region or the second region, whichever has a smaller area in plan view.

27. The contactless communication medium of claim 26, wherein an area ratio of the first region to the second region is smaller than at least 0.25.

28. The contactless communication medium of claim 24, wherein
the IC module is provided in the through hole of one of the plurality of metal plates,
at least part of a peripheral portion of the through hole of another one of the plurality of metal plates overlaps with the planar coil antenna of the IC module via an insulator or a void, and
the through hole of the one of the plurality of metal plates has a same dimension as the IC module or a larger dimension than the IC module to allow the IC module to fit in the through hole of the one of the plurality of metal plates in plan view.

29. The contactless communication medium claim 24, wherein the IC module fits in the through hole of one of the plurality of metal plates, at least part of a peripheral portion of the through hole of the one metal plate overlaps with the planar coil antenna of the IC module, and the through hole of a different one of the plurality of metal plates overlaps with at least part of the planar coil antenna in plan view.

30. The contactless communication medium of claim 24, wherein the insulating layer interposed between the plurality of metal plates has a thickness of 100 um or less.

31. The contactless communication medium of claim 30, wherein the insulating layer has a relative permittivity of 1.5 or more.

32. The contactless communication medium of claim 30, wherein the insulating layer is formed by laminating an insulation sheet having an adhesion function with the plurality of metal plates, followed by pressing.

33. The contactless communication medium of claim 30, wherein the insulating layer is formed by applying a resin having an adhesion function to the plurality of metal plates, followed by pressing.

34. The contactless communication medium of claim 33, wherein the resin is applied to the plurality of metal plates by screen printing.

35. The contactless communication medium of claim 24, wherein part of the insulating layer is composed of a conductive member.

36. The contactless communication medium of claim 35, wherein the conductive member is a conductive resin, an anisotropic conductive resin, a metal flake, solder, a resin ball having a surface on which a metal layer is provided, or a spring having a surface on which a metal layer is provided.

37. The contactless communication medium of claim 24, wherein
the metal plates have a same shape as an IC card that is the contactless communication medium, and
an effective electrostatic capacitance formed by the second metal plate that extends across the slit of the first metal plate is 1 nF or more and 20 nF or less.

38. The contactless communication medium of claim 36, wherein the first metal plate and the second metal plate are electrically connected to each other at a low impedance of 30Ω or less at a communication frequency in a region in which the first metal plate and the planar coil antenna overlap with each other.

39. The contactless communication medium of claim 36, wherein
the first metal plate and the second metal plate are electrically connected to each other at a low impedance of 30Ω or less at a communication frequency in the through hole of the first metal plate, and
the first metal plate and the second metal plate are electrically or physically connected to each other in the through hole by a connection method such as application of a conductive material, welding, plating, pressure welding, screwing, or soldering.

40. The contactless communication medium of claim 24, wherein
the plurality of metal plates comprises three metal plates, when an intermediate metal plate of the three metal plates is viewed as an antenna,
of the three metal plates, the metal plates above and below the intermediate metal plate serve to form a flat plate capacitance between portions of the slit of the intermediate metal plate, and one of the metal plates above and below the intermediate metal plate is physically connected to part of the intermediate metal plate or is electrically connected to part of the intermediate metal plate at a low impedance of 30Ω or less at a communication frequency to form the flat plate capacitance between portions of the slit of the intermediate metal plate.

41. The contactless communication medium of claim 40, wherein
in at least part of a peripheral portion of the through hole, the intermediate metal plate overlaps with the planar coil antennae via an insulator or a void,
one of the upper and lower metal plates serves to form, between portions of the slit of the intermediate metal plate, flat plate series capacitance as two flat plate capacitors connected in series, and
another one of the metal plates is physically connected to part of the intermediate metal plate or is electrically connected to part of the intermediate metal plate at a low impedance of 30Ω or less at a communication frequency to serve to form the flat plate capacitance between portions of the slit of the intermediate metal plate.

42. The contactless communication medium of claim 24, wherein
the metal plates have a same shape as an IC card that is the contactless communication medium, and
a resonance frequency of the first metal plate and the second metal plate laminated while the IC module is removed is more than 13.56 MHz and 25 MHz or less.

43. The contactless communication medium of claim 24, wherein an absolute value of an imaginary part of an impedance at a communication frequency of the IC chip of the IC module or at a continuous wave frequency (13.56 MHz) is larger than an absolute value of an imaginary part of the impedance measured for a module alone of the planar coil antenna of the IC module.

44. The contactless communication medium of claim 24, wherein an absolute value of an imaginary part of the impedance at a communication frequency of the IC chip of the IC module or at a continuous wave frequency is larger than an absolute value of an imaginary part of the impedance while the planar coil antenna of the IC module is attached to the peripheral portion of the through hole of the first metal plate, and the second metal plate is not present.

45. The contactless communication medium of claim 24, wherein the plurality of metal plates include a metal plate in which at least one metal foil is provided on one or both surfaces of a film substrate made of a resin.

46. The contactless communication medium of claim 45, wherein another metal layer is laminated, via the insulating layer, on the film substrate provided with the at least one metal foil.

47. The contactless communication medium of claim 45, wherein a metal foil pattern of the at least one metal foil has an outer dimension smaller than an outer dimension of the film substrate, and the at least one metal foil is laminated so that the metal foil pattern is located inside the film substrate in plan view.

48. The contactless communication medium of claim 45, wherein a metal foil pattern of the at least one metal foil has a through hole larger in size than a through hole of the film substrate, and the at least one metal foil is laminated so that the through hole of the film substrate is located inside the through hole of the metal foil pattern.

49. The contactless communication medium of claim 45, wherein the film substrate has a through hole that is located in a portion of the film substrate corresponding to a through hole of a metal foil pattern of the at least one metal foil and that has a same shape as the through hole of the metal foil pattern or a smaller size than the through hole of the metal foil pattern.

50. The contactless communication medium of claim 45, wherein
  the at least one metal foil is made of copper or aluminum, and
  the at least one metal foil has a thickness larger than a skin depth at a continuous wave frequency during communication.

51. The contactless communication medium of claim 45, wherein at least part of the planar coil antenna of the IC module is provided, via the insulating layer, directly above the through hole of the metal plate in which the at least one metal foil is provided on the film substrate.

52. The contactless communication medium of claim 45, wherein the insulating layer includes the film substrate.

53. The contactless communication medium of claim 45, wherein in the metal plate in which the at least one metal foil is provided on the film substrate, the at least one metal foil comprises a plurality of metal foils, and the plurality of metal foils provided on both surfaces on a front and back of the film substrate are electrically connected to each other by a method such as pressure bonding, pressure welding, or welding.

54. The contactless communication medium of claim 53, wherein when the plurality of metal plates are laminated, one or more of the plurality of metal plates that overlap with a crimped portion of the metal plate in which the plurality of metal foils are provided on the film substrate have a recessed portion or a through hole for avoiding the crimped portion.

* * * * *